(12) United States Patent
Sakamoto

(10) Patent No.: US 12,038,368 B2
(45) Date of Patent: Jul. 16, 2024

(54) CONTROL DEVICE FOR PARTICULATE MATTER DETECTION SENSOR

(71) Applicant: DENSO CORPORATION, Kariya (JP)

(72) Inventor: Yuuki Sakamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 292 days.

(21) Appl. No.: 17/697,125

(22) Filed: Mar. 17, 2022

(65) Prior Publication Data

US 2022/0205895 A1    Jun. 30, 2022

Related U.S. Application Data

(63) Continuation of application No. PCT/JP2020/031107, filed on Aug. 18, 2020.

(30) Foreign Application Priority Data

Sep. 18, 2019    (JP) .................................. 2019-169138

(51) Int. Cl.
| | |
|---|---|
| *G01N 15/00* | (2024.01) |
| *F01N 3/027* | (2006.01) |
| *F01N 11/00* | (2006.01) |
| *G01N 15/06* | (2006.01) |

(52) U.S. Cl.
CPC ......... *G01N 15/0656* (2013.01); *F01N 3/027* (2013.01); *F01N 11/00* (2013.01); *G01N 15/0606* (2013.01); *F01N 2550/04* (2013.01)

(58) Field of Classification Search
CPC ............ G01N 15/0656; G01N 15/0606; F01N 3/027; F01N 11/00; F01N 2550/04
See application file for complete search history.

(56) References Cited

U.S. PATENT DOCUMENTS

| | | | | |
|---|---|---|---|---|
| 2012/0031169 A1* | 2/2012 | Sakamoto | ........... | F02D 41/1466 |
| | | | | 73/25.05 |
| 2018/0135493 A1 | 5/2018 | Takaoka et al. | | |
| 2020/0018679 A1* | 1/2020 | Koike | .................. | G01N 27/043 |

FOREIGN PATENT DOCUMENTS

| | | | | | |
|---|---|---|---|---|---|
| CN | 107300518 A | * | 10/2017 | .............. | F01N 11/00 |
| DE | 102013216899 A1 | | 2/2015 | | |
| EP | 0525566 A1 | | 2/1993 | | |
| EP | 0525566 B1 | * | 10/1995 | | |
| JP | 6515706 B2 | * | 5/2019 | ......... | F02D 41/1466 |
| KR | 20180068133 A | * | 6/2018 | | |

\* cited by examiner

*Primary Examiner* — Jamel E Williams

(74) *Attorney, Agent, or Firm* — Nixon & Vanderhye P.C.

(57) ABSTRACT

In a control device for a particulate matter detection sensor, a voltage value acquiring unit acquires a sensor voltage value which is a value of a voltage being applied across a pair of electrodes in the particulate matter detection sensor. A current value acquiring unit acquires a sensor current value which is a value of a current flowing between the electrodes. An output unit outputs a PM current value corresponding to the amount of deposit of particulate matter on an element part of the particulate matter detection sensor. States which the particulate matter detection sensor is determined to be in by a state determining unit include a sensor failure state and a PM-deposited state. The state determining unit determines whether the particulate matter detection sensor is in the sensor failure state or the PM-deposited state based on the sensor voltage value and the sensor current value.

13 Claims, 22 Drawing Sheets

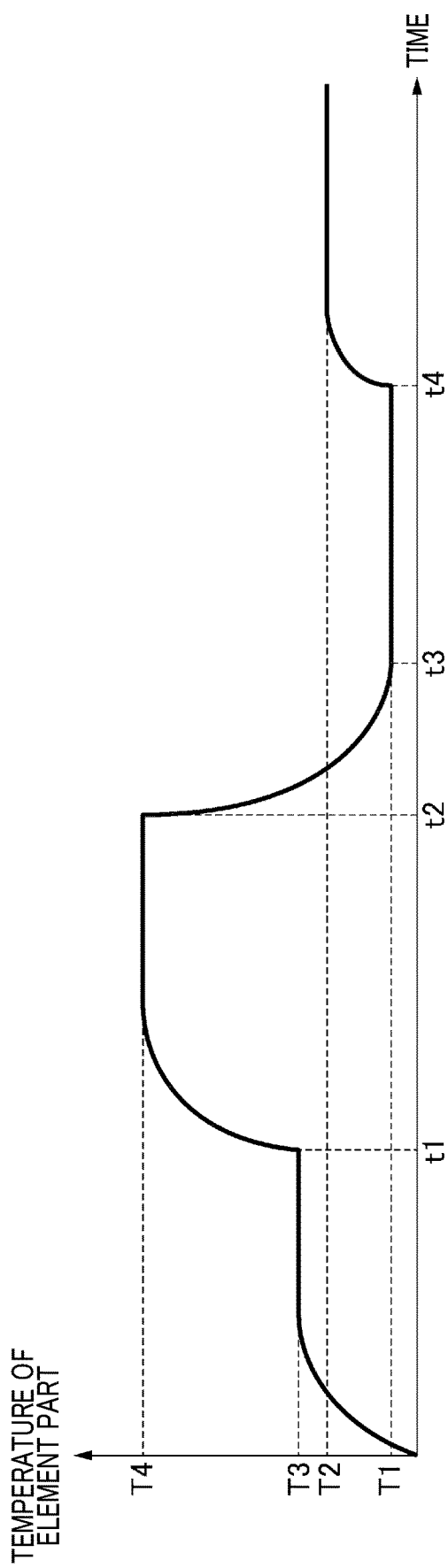

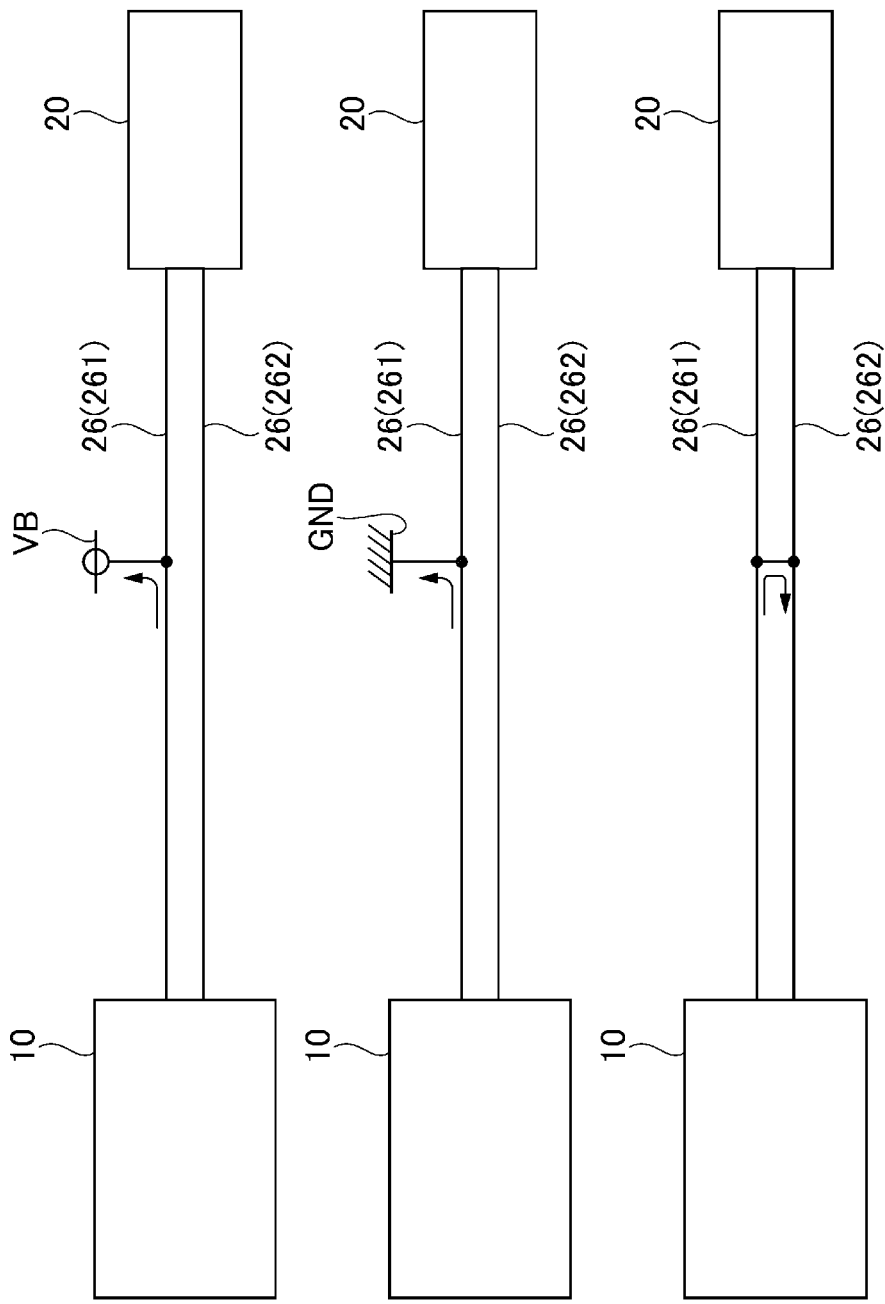

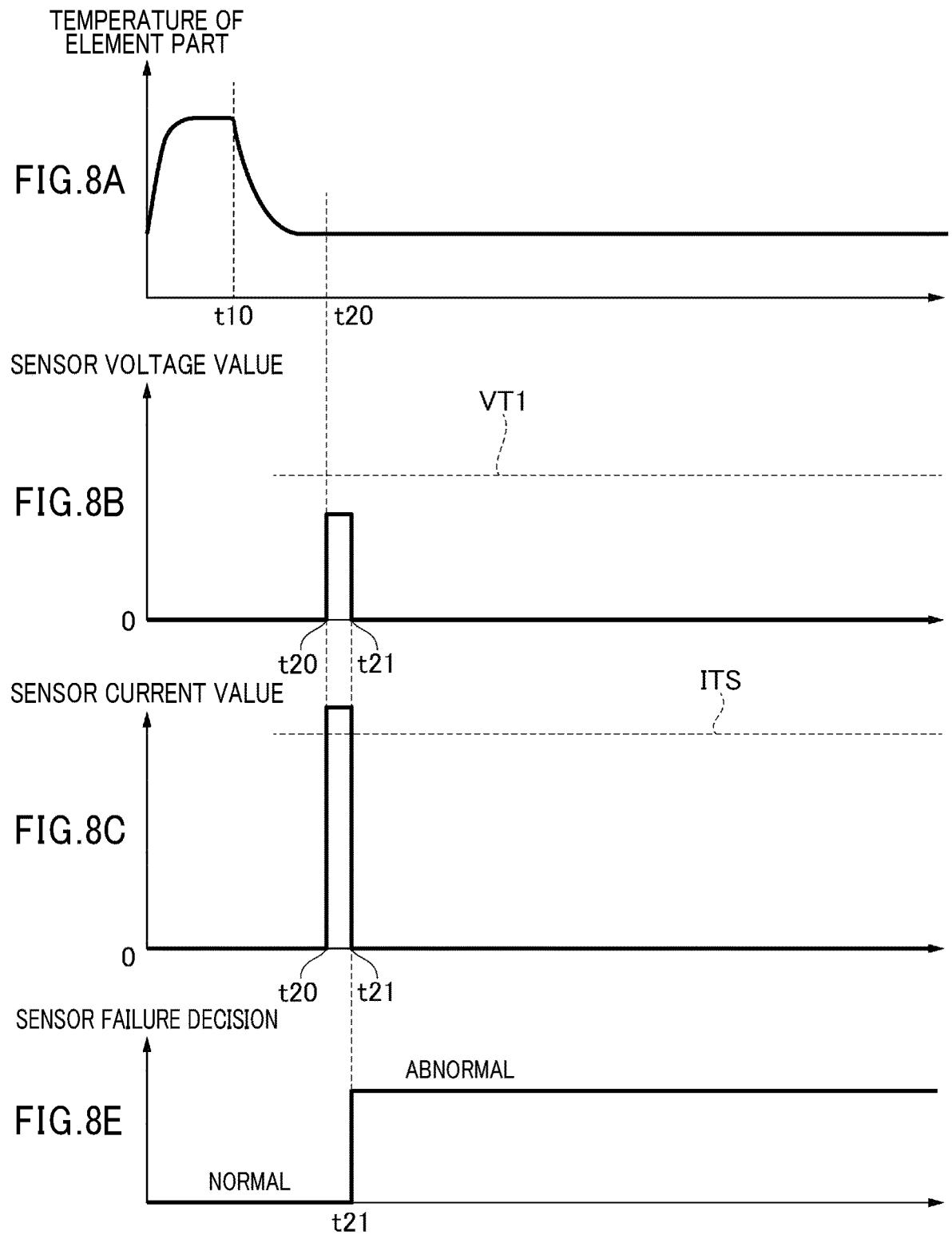

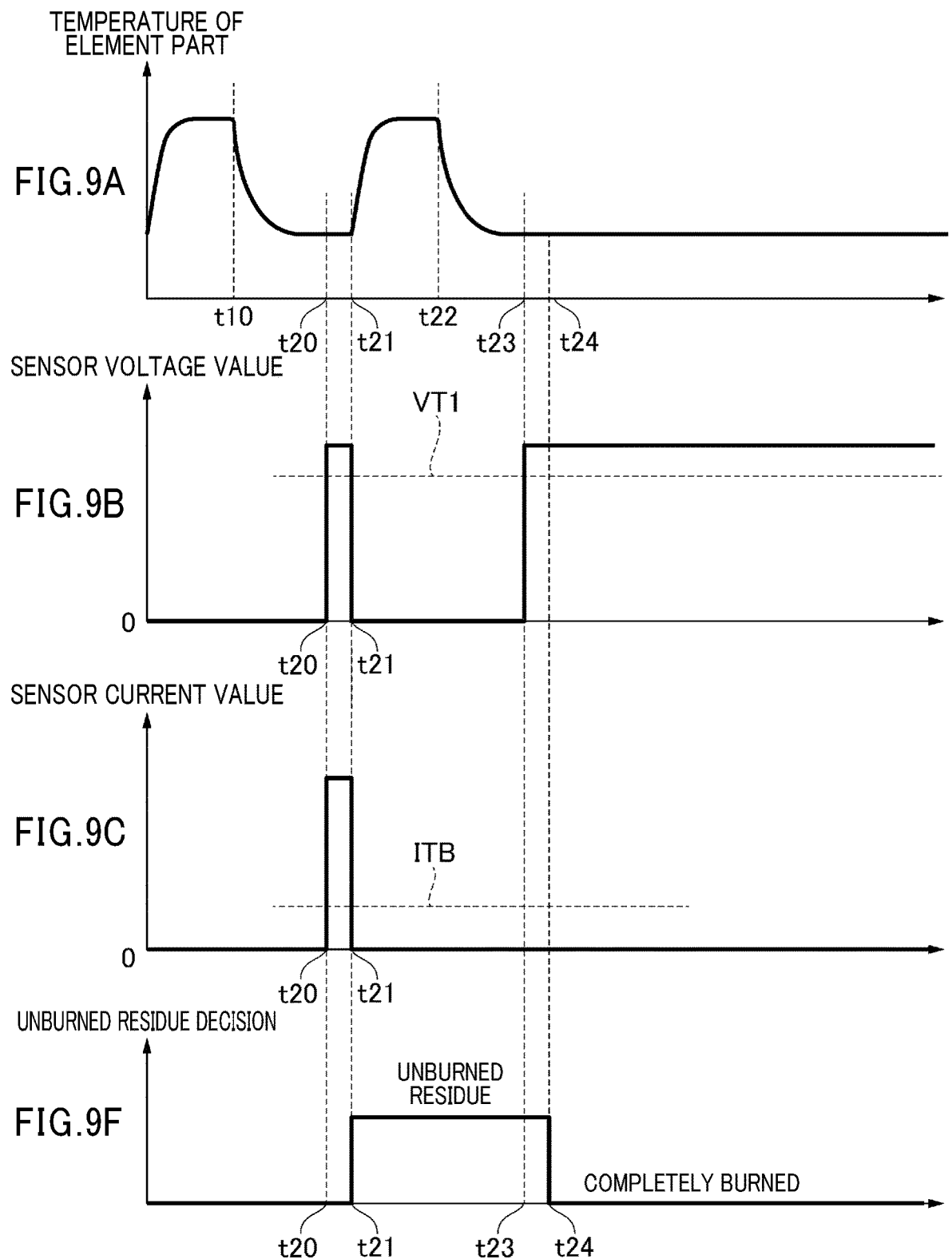

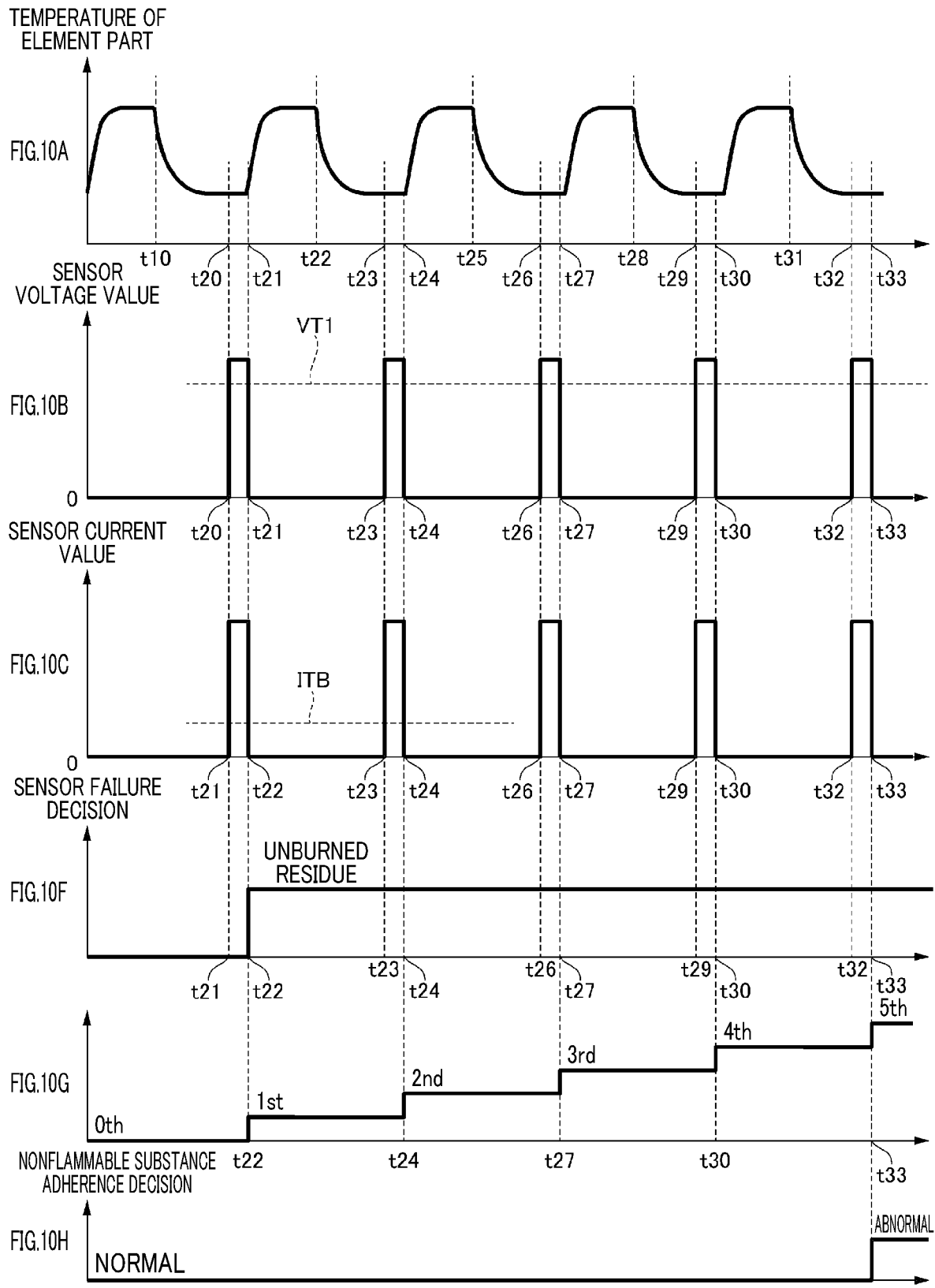

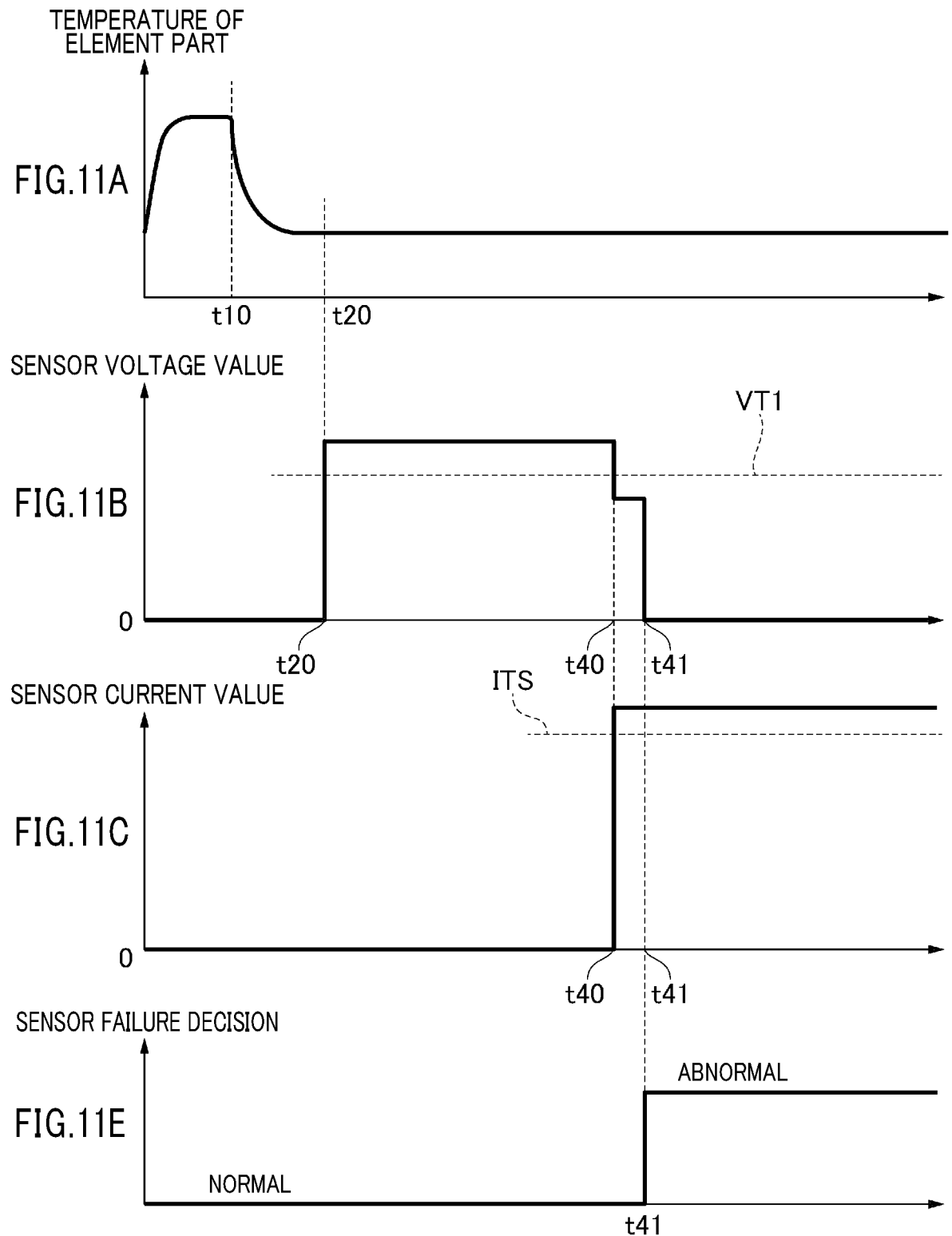

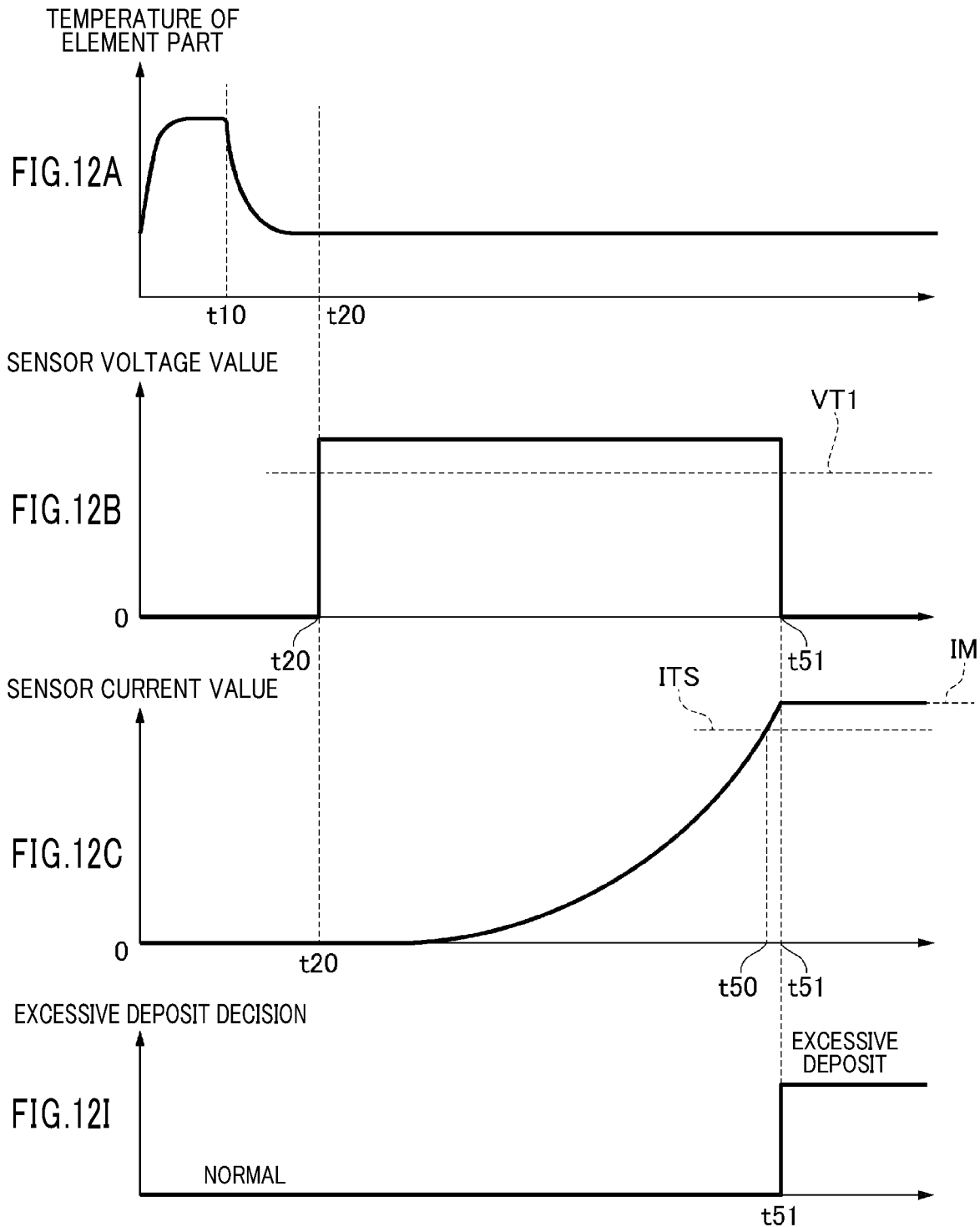

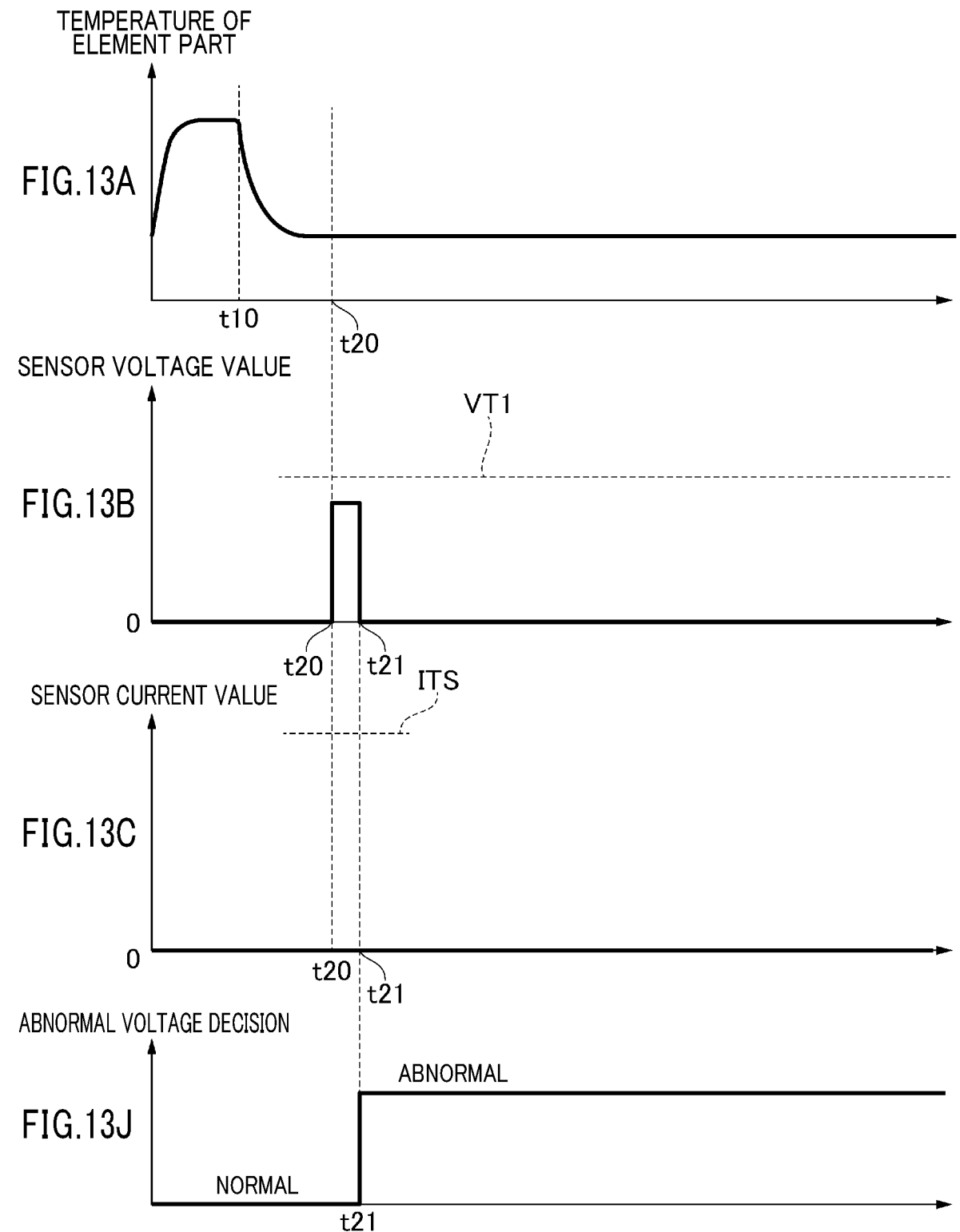

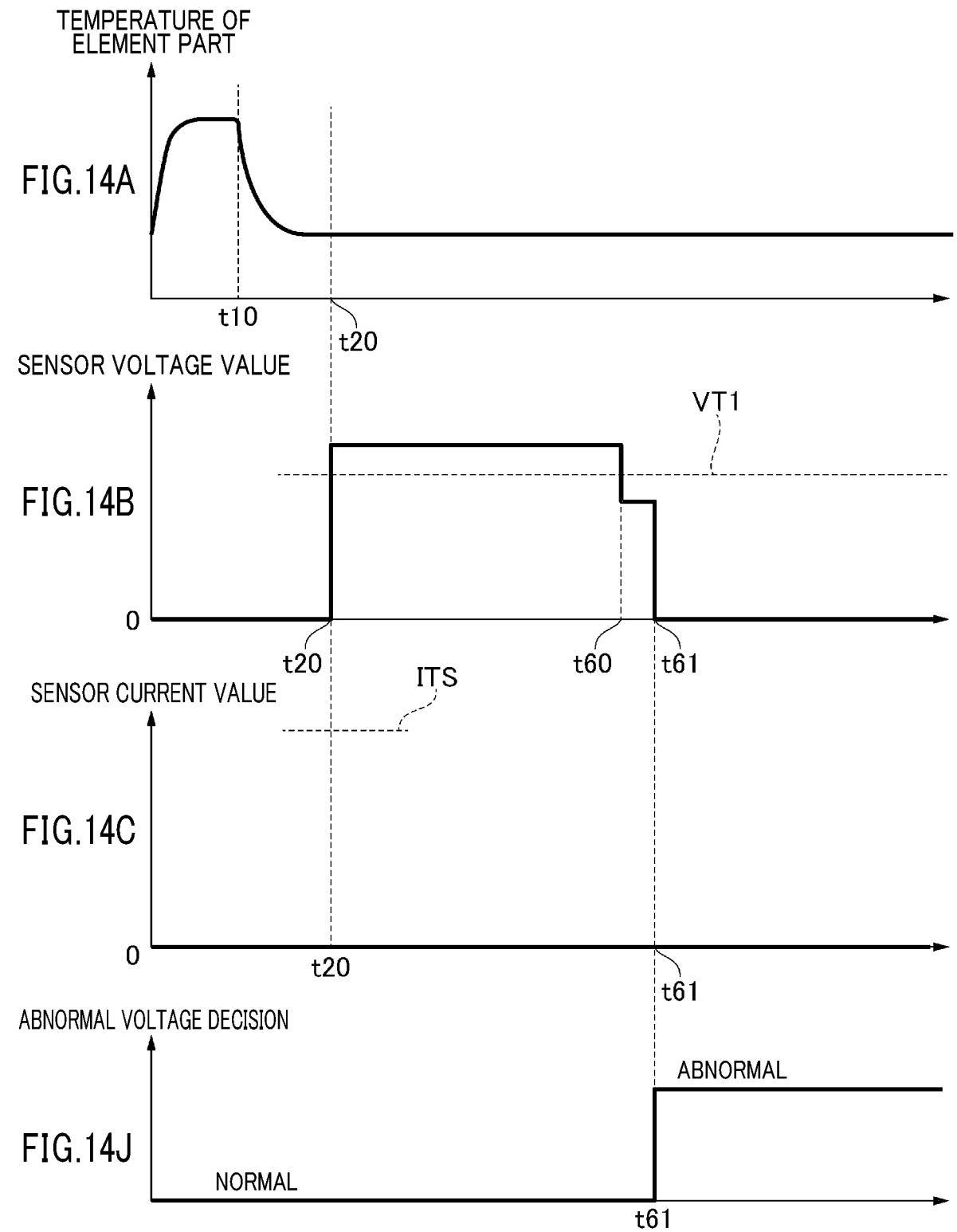

FIG.15

| SENSOR CURRENT VALUE | SENSOR VOLTAGE VALUE | CONDITION | DECISION | |
|---|---|---|---|---|
| EXCESSIVE | DECREASED | WHEN DETECTING DEPOSIT AMOUNT | SENSOR FAILURE STATE | (A) |
| EXCESSIVE | NORMAL | IMMEDIATELY AFTER START OF DEPOSIT AMOUNT DETECTION | UNBURNED RESIDUE STATE | (B) |
| | | | (IN CASE OF MULTIPLE TIMES) NONFLAMMABLE SUBSTANCE ATTACHED | (C) |
| | | WHEN DETECTING DEPOSIT AMOUNT (EXCLUDING IMMEDIATELY AFTER THE START) | EXCESSIVE DEPOSIT STATE | (D) |
| NORMAL | DECREASED | WHEN DETECTING DEPOSIT AMOUNT | ABNORMAL VOLTAGE STATE | (E) |
| NORMAL | NORMAL | WHEN DETECTING DEPOSIT AMOUNT | NORMAL | (F) |

CONTROL DEVICE FOR PARTICULATE MATTER DETECTION SENSOR

CROSS-REFERENCE TO RELATED APPLICATION

This application is a continuation application of International Application No. PCT/JP2020/031107 filed Aug. 18, 2020 which designated the U.S. and claims priority to Japanese Patent Application No. 2019-169138 filed on Sep. 18, 2019, the contents of each of which are incorporated herein by reference.

BACKGROUND

Technical Field

The present disclosure relates to a control device for a particulate matter detection sensor.

Related Art

In recent years, vehicles are required to have a reduced amount of particulate matter emitted to the outside together with exhaust gas. To this end, the exhaust pipe through which the exhaust gas passes is provided with components such as a filter for collecting particulate matter, and a particulate matter detection sensor for detecting particulates downstream of the filter. Whether the filter upstream of the particulate matter detection sensor is functioning properly or not can be determined from the output of the sensor.

BRIEF DESCRIPTION OF THE DRAWINGS

In the accompanying drawings:

FIG. 5 is a timing chart showing an example of how the temperature of the element part of the particulate matter detection sensor changes;

FIGS. 7A-7C are diagrams for explaining fault modes of the particulate matter detection sensor;

FIGS. 8A-8C and 8E are diagrams for explaining an outline of control performed by the control device according to the first embodiment;

FIGS. 9A-9C and 9F are diagrams for explaining an outline of control performed by the control device according to the first embodiment;

FIGS. 10A-10C and 10F-10H are diagrams for explaining an outline of control performed by the control device according to the first embodiment;

FIGS. 11A-11C and 11E are diagrams for explaining an outline of control performed by the control device according to the first embodiment;

FIGS. 12A-12C and 12I are diagrams for explaining an outline of control performed by the control device according to the first embodiment;

FIGS. 13A-13C and 13J are diagrams for explaining an outline of control performed by the control device according to the first embodiment;

FIGS. 14A-14C and 14J are diagrams for explaining an outline of control performed by the control device according to the first embodiment;

FIG. 15 is a diagram showing the decision that is going to be made by the state determining unit for each condition;

DESCRIPTION OF SPECIFIC EMBODIMENTS

Figure 1:
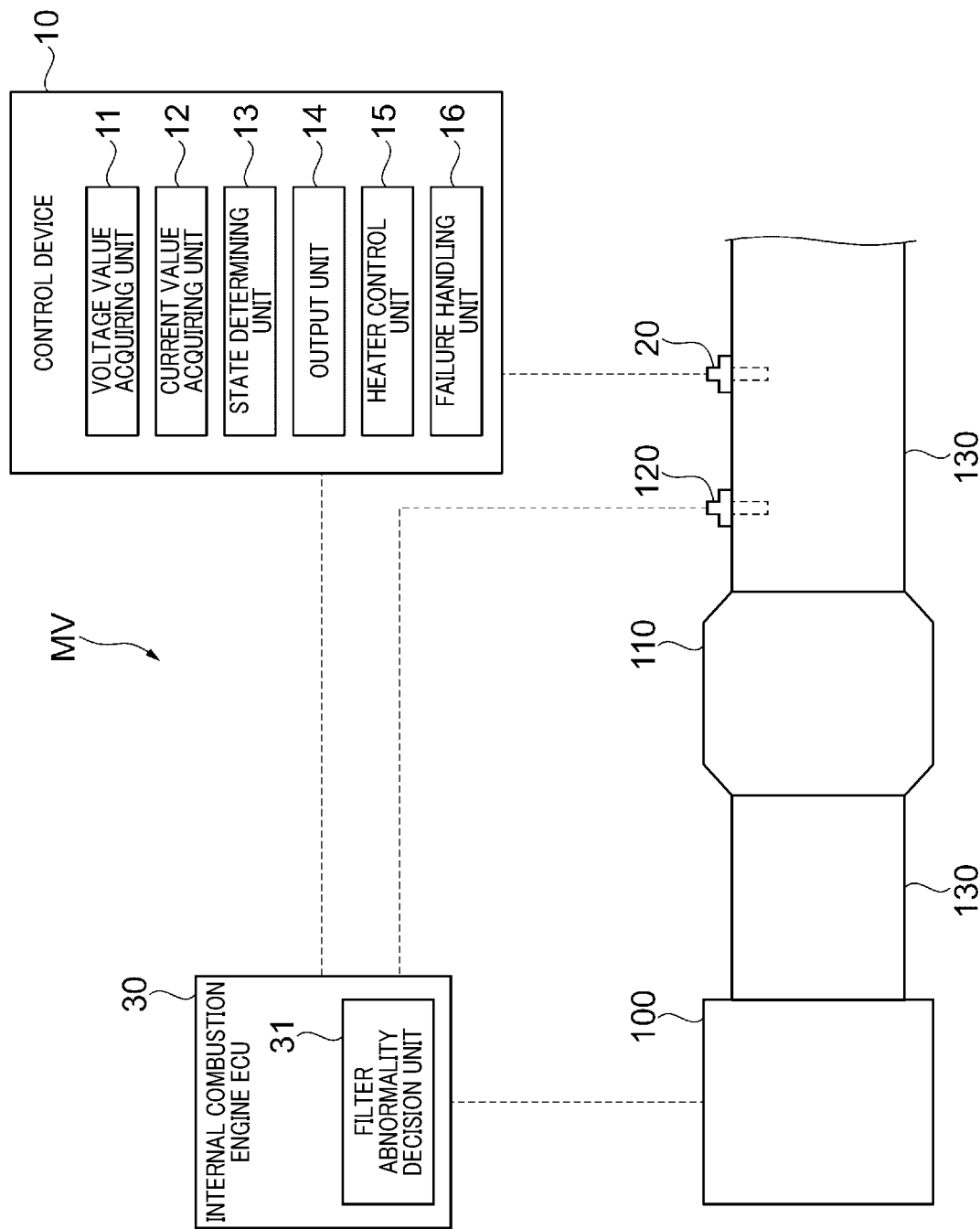
FIG. 1 is a diagram schematically showing the configuration of a control device according to the first embodiment and the configuration of a vehicle in which the control device is provided.

As described in JP 2018-080655 A specified below, a particulate matter detection sensor has a pair of electrodes. When a voltage is applied across the electrodes, a current corresponding to the amount of deposited particulate matter flows. This makes it possible to determine the amount of deposited particulate matter based on the magnitude of the current.

When a failure such as a short circuit between the electrodes occurs in the particulate matter detection sensor, a current flows between the electrodes even when there is actually no deposition of particulate matter. This may lead to erroneously determining that particulate matter is deposited.

To tackle this, the abnormality diagnosis device described in JP 2018-080655 A specified below determines whether the particulate matter detection sensor is malfunctioning or not after burning (or combusting) and removing the particulate matter deposited on the element part by the sensor regeneration process, and before starting the detection of particulate matter. Determining whether the sensor is malfunctioning at such a timing, that is, at a timing where it is presumed that particulate matter is not deposited on the element part makes it possible to prevent the above-described erroneous detection.

Further, JP 2018-080655 A proposes stopping application of voltage across the electrodes when the current flowing between the electrodes reaches a predetermined abnormality threshold during the particulate matter detection. JP 2018-080655 A states that this prevents excessive deposition of particulate matter on the sensor element part and assures that the particulate matter is removed in the subsequent sensor regeneration process.

As described above, the abnormality diagnosis device described in JP 2018-080655 A can correctly determine whether the particulate matter detection sensor is malfunctioning if it has been malfunctioning from the beginning before starting the particulate matter detection. However, if the particulate matter detection sensor was not malfunctioning at the beginning and failure occurs after starting the particulate matter detection, it cannot correctly determine whether the sensor is malfunctioning. In this case, the abnormality diagnosis device erroneously determines that there is an abnormality with the filter and the amount of deposited particulate matter is increasing even though the filter is actually functioning normally.

Accordingly, the abnormality diagnosis device described in JP 2018-080655 A cannot correctly determine whether a particulate matter detection sensor has failed regardless of the timing at which failure occurs.

In view of the foregoing, it is desired to have a control device capable of correctly determining whether a particulate matter detection sensor is malfunctioning regardless of the timing at which failure occurs.

One aspect of the present disclosure provides a control device for a particulate matter detection sensor. The particulate matter detection sensor includes an element part formed with a pair of electrodes facing each other, and the particulate matter detection sensor is configured such that a current corresponding to an amount of deposit of particulate matter on the element part flows between the electrodes. The control device includes: a voltage value acquiring unit that acquires a sensor voltage value which is a value of a voltage being applied across the electrodes; a current value acquiring unit that acquires a sensor current value which is a value of a current flowing between the electrodes; a state determining unit that determines a state of the particulate matter detection sensor; and an output unit that outputs a PM current value corresponding to the amount of deposit. States which the particulate matter detection sensor is determined to be in by the state determining unit includes a sensor failure state in which the particulate matter detection sensor is malfunctioning, and a PM-deposited state in which particulate matter is deposited on the element part. The state determining unit determines whether the particulate matter detection sensor is in the sensor failure state or the PM-deposited state based on the sensor voltage value and the sensor current value.

A current flows between the electrodes of the particulate matter detection sensor in both the sensor failure state and the PM-deposited state. This makes it difficult to accurately determine whether the particulate matter detection sensor is in the sensor failure state or the PM-deposited state in the conventional way based on only the sensor current value.

The inventors found out that the sensor voltage value in the sensor failure state is lower than that in the normal state, while the sensor voltage value in the PM-deposited state is about the same as that in the normal state. The above-described control device is based on this new insight. The control device determines whether the particulate matter detection sensor is in the sensor failure state or the PM-deposited state based on both the sensor voltage value and the sensor current value instead of only the sensor current value. This makes it possible to accurately determine whether the particulate matter detection sensor is malfunctioning regardless of the timing at which the failure occurred.

According to the present disclosure, a control device capable of accurately determining whether a particulate matter detection sensor is malfunctioning regardless of the timing at which the failure occurred is provided.

The present embodiment will be described with reference to the drawings. In the drawings, to facilitate understanding of the description, the same components are denoted by the same reference numbers when possible, and they will not be explained repeatedly.

EMBODIMENTS

The first embodiment will be described. A control device 10 according to this embodiment is installed in a vehicle MV together with a particulate matter detection sensor 20, and is configured as a device for controlling the particulate matter detection sensor 20. First, the configuration of the vehicle MV will be described with reference to FIG. 1.

Of the vehicle MV, FIG. 1 schematically shows only the configuration of the internal combustion engine 100 and its exhaust system. The vehicle MV includes the internal combustion engine 100, an exhaust pipe 130, a particle filter 110, and an exhaust gas temperature sensor 120.

The internal combustion engine 100 is a so-called engine. The internal combustion engine 100 generates driving force for making the vehicle MV travel by burning fuel. The exhaust pipe 130 is a pipe for discharging the exhaust gas generated by the combustion in the internal combustion engine 100 to the outside.

The particle filter 110 is provided in the middle of the exhaust pipe 130 and is a filter for collecting particulate matter contained in the exhaust gas. The particle filter 110 is also referred to as a Diesel Particulate Filter (DPF) or a Gasoline Particulate Filter (GPF). The particle filter 110 is configured by forming a large number of lattice-like channels in a porous ceramics member and blocking the channels at alternate ends. Since a particular filter having a known configuration can be used as the particle filter 110, it will not be specifically illustrated or described.

The exhaust gas temperature sensor 120 is a sensor for detecting the temperature of the exhaust gas passing through the exhaust pipe 130. The exhaust gas temperature sensor 120 is placed downstream of the particle filter 110 in the exhaust pipe 130, more specifically, near the particulate matter detection sensor 20 described next. The temperature of the exhaust gas measured by the exhaust gas temperature sensor 120 is transmitted to the internal combustion engine ECU 30 described later.

The particulate matter detection sensor 20 is a sensor for detecting the amount of particulate matter contained in the exhaust gas that has passed through the particle filter 110. The particulate matter detection sensor 20 is placed downstream of the particle filter 110 in the exhaust pipe 130. The particulate matter detection sensor 20 makes it possible to detect emission of an exhaust gas containing a large amount of particulate matter. When the particle filter 110 is not functioning properly, it can also be detected quickly. The signal output from the particulate matter detection sensor 20, that is, the signal indicating the amount of particulate matter is transmitted to the control device 10 described later.

Figure 2:
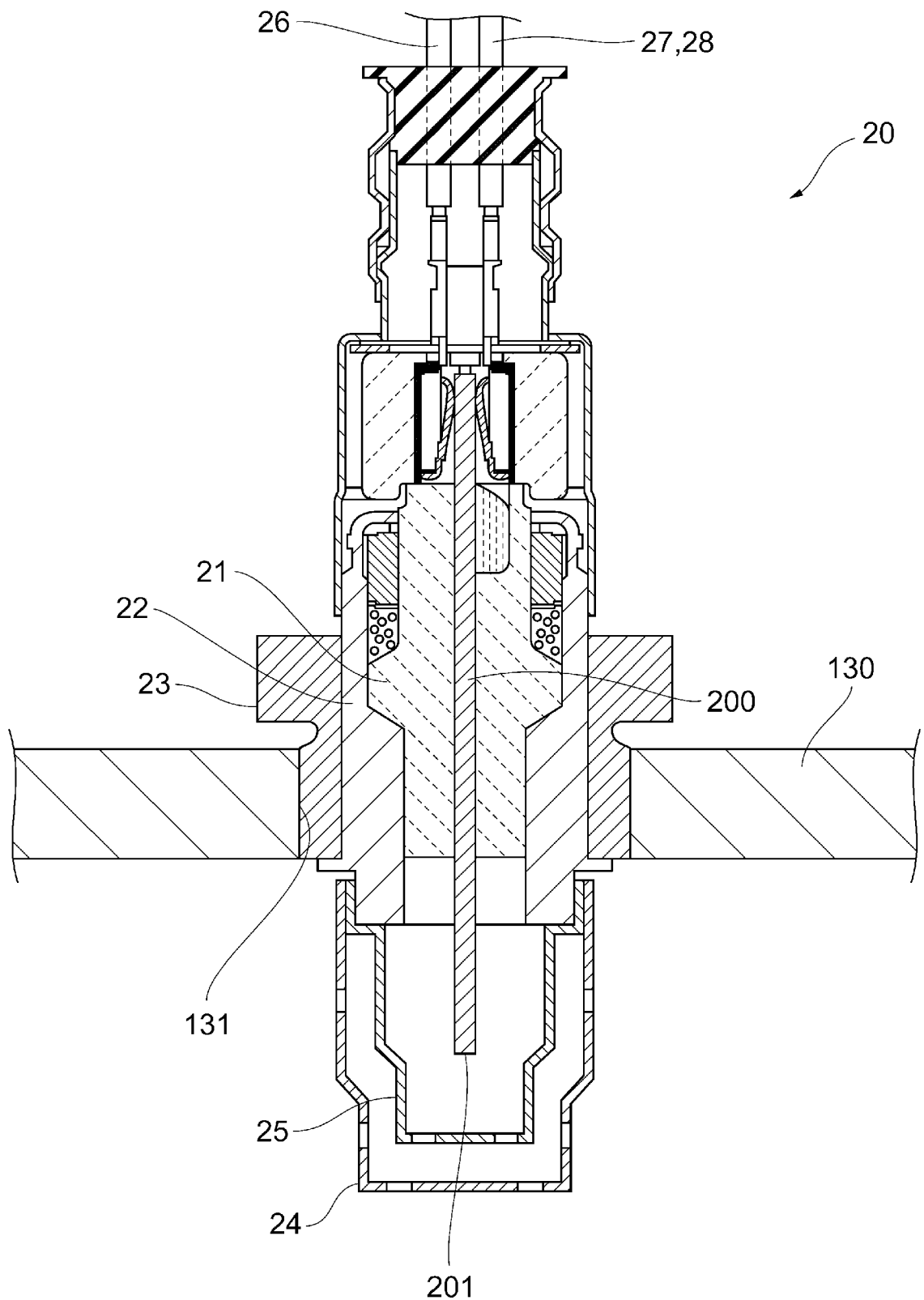
FIG. 2 is a cross-sectional view showing the configuration of a particulate matter detection sensor.

The specific configuration of the particulate matter detection sensor 20 will be described with reference to FIG. 2. The reference number 130 in FIG. 2 indicates a cross section of the pipe wall forming the exhaust pipe 130. In FIG. 2, the area above the pipe wall is the space outside the exhaust pipe 130, and the area below the pipe wall is the space inside the exhaust pipe 130. The particulate matter detection sensor 20 is inserted from the outside through the through hole 131 formed in the exhaust pipe 130 so that a part of it projects into the space inside the exhaust pipe 130.

Figure 3:
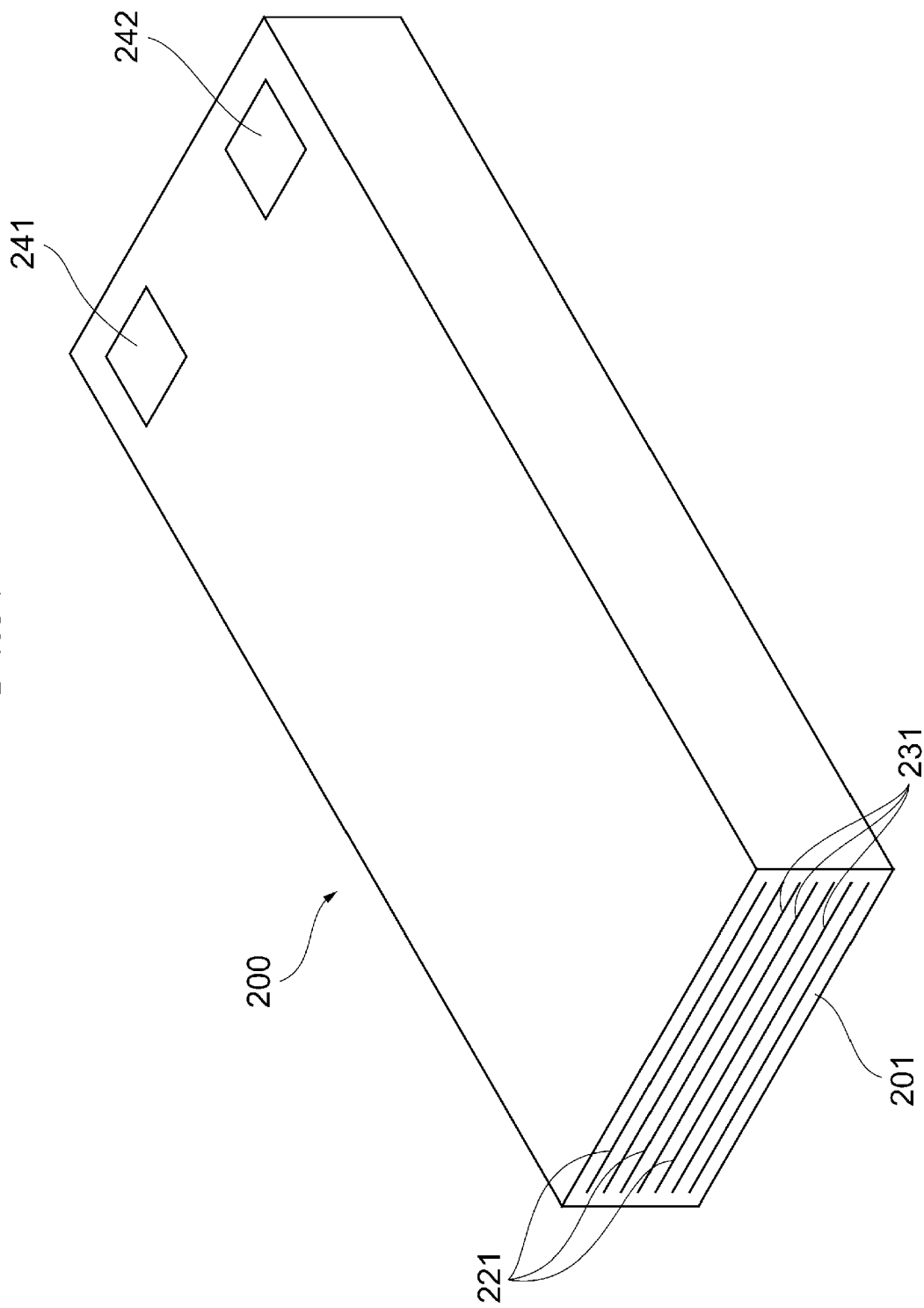
FIG. 3 is a diagram showing the appearance of an element part of the particulate matter detection sensor.
Figure 4:
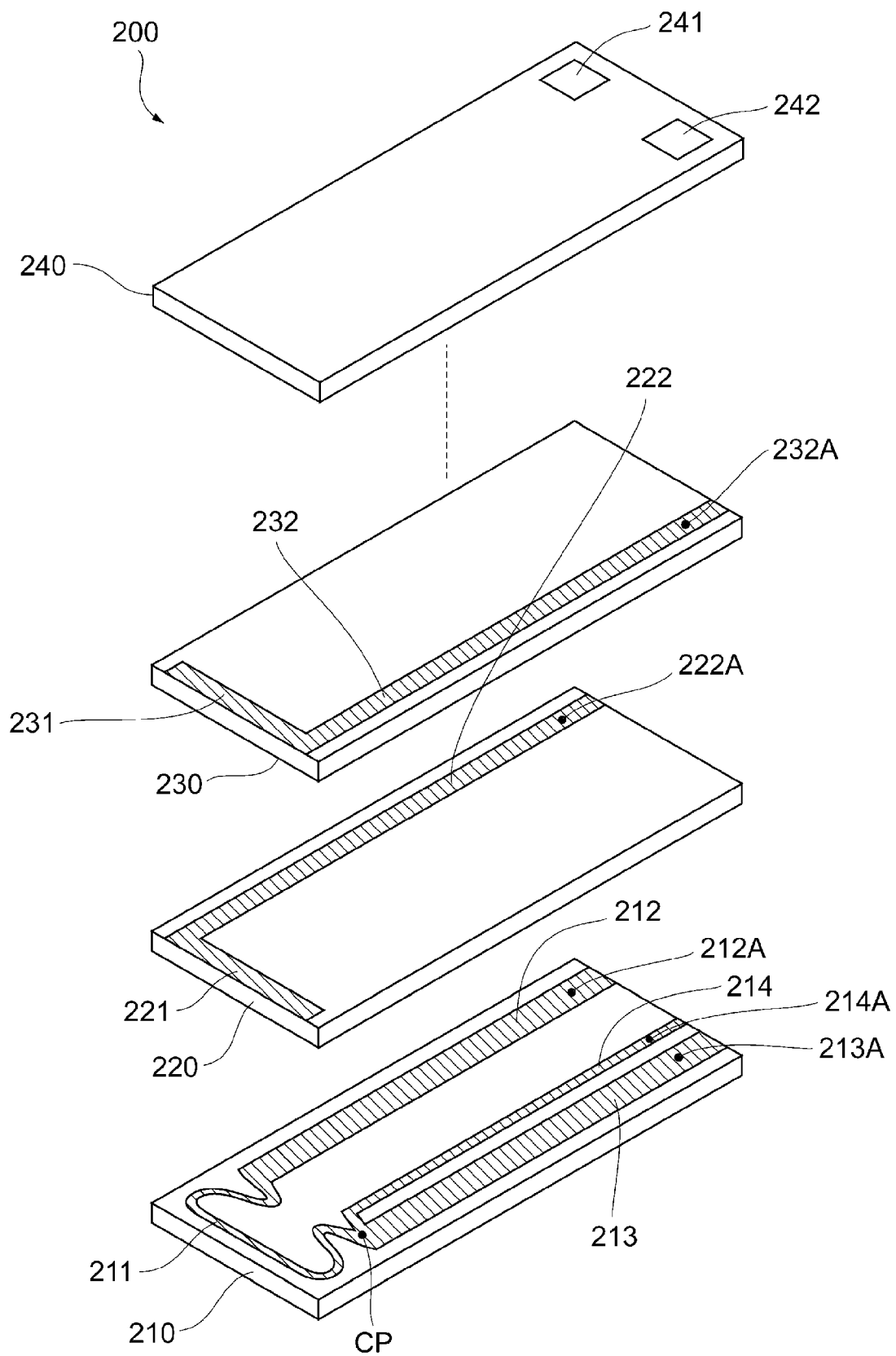
FIG. 4 is an exploded assembly diagram showing the configuration of the element part of the particulate matter detection sensor.

The particulate matter detection sensor 20 has an element part 200 inside it. The element part 200 is an element configured as a part for detecting particulate matter. FIG. 3 shows the appearance of the element part 200. FIG. 4 shows an exploded view of the specific configuration of the element part 200.

As shown in FIG. 4, the element part 200 is configured by laminating a plurality of substrates which are rectangular plate members. Each substrate is made of ceramics. The bottom substrate 210 in FIG. 4 has a heater 211, lead electrodes 212, 213, and a sensing electrode 214 formed on its upper surface. They form one electrode pattern as a whole, and they are formed on the upper surface of the substrate 210 by, for example, screen printing.

The heater 211 is a part configured as an electric heater that generates heat by receiving power. The heater 211 is formed near one end of the substrate 210 in the longitudinal direction. The heater 211 is provided to heat, in particular, a detection surface 201 of the element part 200 which will be described later.

The lead electrodes 212 and 213 are a pair of electrodes formed to supply power to the heater 211. The lead electrodes 212 and 213 are formed so that they extend toward the other end of the substrate 210 in the longitudinal direction from the heater 211. The width and length of the lead electrode 212 are about the same as the width and length of the lead electrode 213. Power lines 27 shown in FIG. 2 are connected to the lead electrodes 212 and 213. The power lines 27 are a pair of wires provided to supply power from the control device 10 to the heater 211. The power lines 27 connect the lead electrodes 212 and 213 to the control device 10 so that power can be supplied from the control device 10 to the heater 211. One of the pair of power lines 27 is connected to the lead electrode 212, and the other is connected to the lead electrode 213.

The part assigned with the reference number 212A in FIG. 4 is formed with a through hole (not shown) penetrating the substrate 210. One of the power lines 27 is connected to the lead electrode 212 from the outside through this through hole. Similarly, the part assigned with the reference number 213A in FIG. 4 is formed with a through hole (not shown) penetrating the substrate 210. The other power line 27 is connected to the lead electrode 213 from the outside through this through hole.

One end of the sensing electrode 214 is connected to a connection part CP between the lead electrode 213 and the heater 211. The sensing electrode 214 is formed so that it extends from the connection part CP in the longitudinal direction of the substrate 210. The sensing electrode 214 is an electrode formed to acquire the potential at the connection part CP between the lead electrode 213 and the heater 211.

A sensing line 28 shown in FIG. 2 is connected to the sensing electrode 214. The sensing line 28 connects the sensing electrode 214 with the control device 10 so that the control device 10 can acquire the potential at the connection part CP. The part assigned with the reference number 214A in FIG. 4 is formed with a through hole (not shown) penetrating the substrate 210. The sensing line 28 is connected to the sensing electrode 214 from the outside through this through hole.

Electrodes 221 and 222 are formed on the face of a substrate 220 placed over the substrate 210 that is on the side opposite to the substrate 210. They form one electrode pattern as a whole, and, as with the above-described elements such as the heater 211, they are formed by, for example, screen printing. The electrode 221 is formed so that it extends along an edge of the substrate 220 at one end thereof in the longitudinal direction, specifically, the edge on the side on which the heater 211 is formed. The electrode 222 is formed so that it extends in the longitudinal direction of the substrate 220 from an end of the electrode 221 in the transverse direction of the substrate 220, specifically, from the end of the electrode 221 that is further from the viewer in FIG. 4.

Electrodes 231 and 232 are formed on the face of another substrate 230 placed over the substrate 220 that is on the side opposite to the substrate 220. They form one electrode pattern as a whole, and, as with the above-described elements such as the heater 211, they are formed by, for example, screen printing. The electrode 231 is formed so that it extends along an edge of the substrate 230 at one end thereof in the longitudinal direction, specifically, the edge on the side on which the heater 211 is formed. The electrode 232 is formed so that it extends in the longitudinal direction of the substrate 230 from an end of the electrode 231 in the transverse direction of the substrate 230, specifically, from the end of the electrode 231 that is closer to the viewer in FIG. 4.

Between the bottom substrate 210 and the top substrate 240 in FIG. 4, more than one pair of the above-described substrates 220 and 230 are stacked so that the substrates 220 and 230 alternate. As a result, as shown in FIG. 3, the electrodes 221 and 231 are exposed on the detection surface 201 which is an end face of the element part 200 in the longitudinal direction. The electrodes 221 and 231 are laminated alternately.

A pair of electrodes 241 and 242 is formed on the face of the top substrate 240 in FIG. 4 that is on the side opposite to the rest such as the substrate 230. They are both formed near one end of the substrate 240 in its longitudinal direction, specifically, the end on the side on which the heater 211 is not formed.

The electrode 241 is located above the part of the electrode 222 denoted by 222A in FIG. 4. Similarly, the electrode 242 is located above the part of the electrode 232 denoted by 232A in FIG. 4.

Each of the substrates 220, 230, and 240 is formed with a through hole penetrating the substrate at a position overlapping the reference number 222A in the vertical direction. The electrode 241 is electrically connected to the electrodes 222 and electrodes 221 via these through holes.

Similarly, each of the substrates 220, 230, and 240 is formed with a through hole penetrating the substrate at a position overlapping the reference number 232A in the vertical direction. The electrode 242 is electrically connected to the electrodes 232 and electrodes 231 via these through holes.

Detection lines 26 shown in FIG. 2 are connected to the electrodes 241 and 242. The detection lines 26 are a pair of wires connecting the electrodes 241 and 242 to the control device 10. One of the pair of detection lines 26 is connected to the electrode 241, and the other is connected to the electrode 242.

Note that, in this embodiment, a plurality of electrodes 221 and a plurality of electrodes 231 are exposed on the detection surface 201. However, since the electrodes 221 are electrically connected with each other as described above, they can be regarded as one electrode as a whole. The same applies to the electrodes 231. The electrodes 221 and electrodes 231 can therefore be expressed as "a pair of electrodes" facing each other.

The control device 10 applies a certain voltage across the electrodes 241 and 242 via the pair of detection lines 26. At this time, voltage is also applied across the electrodes 221 and 231 exposed on the detection surface 201.

When no particulate matter is deposited on the detection surface 201, no current flows between the electrodes 221 and 231. On the other hand, when particulate matter is deposited on the detection surface 201, since particulate matter is electrically conductive, a current flows between the electrodes 221 and 231. The larger the amount of particulate matter deposited on the detection surface 201, the larger the current.

In summary, the particulate matter detection sensor 20 of the present embodiment has the element part 200 formed with a pair of electrodes 221 and 231 facing each other, and a current corresponding to the amount of particulate matter deposited on the element part 200 flows between the electrodes 221 and 231.

The control device 10 detects this current as the current flowing through the pair of detection lines 26. The control device 10 can determine the amount of particulate matter deposited on the detection surface 201 of the element part 200 based on the magnitude of the current.

When the amount of particulate matter deposited on the detection surface 201 increases, the current becomes constant at a certain point. The control device 10 can therefore no longer detect newly deposited particulate matter. Then, the control device 10 supplies power to the heater 211 to generate heat so as to heat the detection surface 201 of the element part 200 and burn the particulate matter deposited on the detection surface 201. As a result, the particulate matter is removed from the detection surface 201, and the control device 10 can continue to detect the amount of particulate matter.

Returning to FIG. 2, the rest of the configuration of the particulate matter detection sensor 20 will be described. The particulate matter detection sensor 20 includes, in addition to the element part 200 described above, a holding part 21, a housing 22, a fastening part 23, and coverings 24 and 25.

The holding part 21 is a member for holding the element part 200 and is made of ceramics which is an insulator. The element part 200 is held by the holding part 21 with its leading end having the detection surface 201 projected into the space inside the exhaust pipe 130.

The housing 22 is a cylindrical member made of metal. The housing 22 is a member that generally forms the outer shape of the particulate matter detection sensor 20, and it surrounds the holding part 21. The end of the housing 22 located inside the exhaust pipe 130 is uncovered, and the element part 200 is projecting from this end.

The fastening part 23 is a part for fixing the particulate matter detection sensor 20 to the exhaust pipe 130. The fastening part 23 is provided so that it surrounds a part of the outer circumferential surface of the housing 22. The fastening part 23 is made of metal.

The outer circumferential surface of the fastening part 23 is provided with a male thread (not shown). The inner circumferential surface of the through hole 131 formed in the exhaust pipe 130 is provided with a female thread (not shown). The male thread on the outer circumferential surface of the fastening part 23 is screwed into the female thread on the inner circumferential surface of the through hole 131. The particulate matter detection sensor 20 is thereby fastened and fixed to the exhaust pipe 130.

The coverings 24 and 25 are both attached to the leading end of the housing 22, and are provided so as to double cover the part around the element part 200 protruding from the leading end. The covering 25 is the inner covering and the covering 24 is the outer covering. A plurality of through holes are formed in each of the coverings 24 and 25. Part of the exhaust gas passing through the exhaust pipe 130 flows into the inside of the coverings 24 and 25 through these through holes. Part of the particulate matter contained in the exhaust gas is deposited on the detection surface 201 of the element part 200 and is detected by the control device 10 in the above-described manner.

The detection lines 26, the power lines 27, and the sensing line 28 are connected to the tip of the part of the particulate matter detection sensor 20 projecting into the space outside the exhaust pipe 130. In FIG. 2, the pair of detection lines 26 are bundled and illustrated as a single line. Similarly, the pair of power wires 27 and the sensing line 28 are bundled together and illustrated as a single line.

Retuning to FIG. 1, the internal combustion engine ECU 30 is a control device for controlling the operation of the internal combustion engine 100. The internal combustion engine ECU 30 is configured as a computer system including components such as a CPU, a ROM, and a RAM. The internal combustion engine ECU 30 adjusts the magnitude of the driving force output from the internal combustion engine 100 by adjusting, for example, the position of the throttle valve (not shown) according to, for example, the driver's operation. The internal combustion engine ECU 30 also adjusts the air-fuel ratio in the internal combustion engine 100 so as to minimize the concentration of substances such as nitrogen oxides in the exhaust gas. Since these controls performed by the internal combustion engine ECU 30 are the same as those already known, they will not be specifically described. The communication between the internal combustion engine ECU 30 and the control device 10 described subsequently is bidirectional.

The internal combustion engine ECU 30 includes a filter abnormality decision unit 31 as a functional control block. The filter abnormality decision unit 31 determines whether there is an abnormality with the particle filter 110 based on the PM current value described later. The specific decision process will be described later.

As described earlier, the control device 10 according to this embodiment is configured as a device for controlling the particulate matter detection sensor 20. As with the internal combustion engine ECU 30, the control device 10 is configured as a computer system including components such as a CPU, a ROM, and a RAM. The control device 10 performs processing required to detect the current corresponding to the amount of deposited particulate matter by the particulate matter detection sensor 20, processing for determining the state of the particulate matter detection sensor 20, and the like.

The control device 10 includes, as functional control blocks, a voltage value acquiring unit 11, a current value acquiring unit 12, a state determining unit 13, an output unit 14, a heater control unit 15, and a failure handling unit 16.

Note that some or all of the functions of the control device 10 described below may be provided in the internal combustion engine ECU 30. That is, the internal combustion engine ECU 30 may also serve as the control device 10 and control the particulate matter detection sensor 20. Conversely, some or all of the functions of the internal combustion engine ECU 30 may be provided in the control device 10. The distribution of functions between the internal combustion engine ECU 30 and the control device 10, as well as the specific device configuration are not limited in any way.

The voltage value acquiring unit 11 performs the processing for acquiring the value of the voltage applied across the electrodes 221 and 231 of the particulate matter detection sensor 20. The value of the voltage is also referred to as a "sensor voltage value" hereinafter.

The current acquiring part 12 performs the processing for acquiring the value of the current flowing between the electrodes 221 and 231 of the particulate matter detection sensor 20. The value of the current is also referred to as a "sensor current value" hereinafter. As described above, the sensor current value is a current value that changes according to the amount of particulate matter deposited on the element part 200.

Note that, although the processing for applying voltage across the electrodes 221 and 231 is performed by the current value acquiring unit 12 in this embodiment, it may be carried out by another part of the control device 10.

The state determining unit 13 performs the processing for determining the state of the particulate matter detection sensor 20. As will be described in detail later, the state of the particulate matter detection sensor determined by the state determining unit 13 may be one of a plurality of states including a "sensor failure state" in which the particulate matter detection sensor 20 is malfunctioning, and a "PM-deposited state" in which particulate matter is deposited on the element part 200. How the state determining unit 13 determines the state of the sensor will be described in detail later.

The output unit 14 performs the processing for outputting a PM current value. A "PM current value" is a value corresponding to the amount of particulate matter deposited on the element part 200, and is transmitted from the control device 10 to the internal combustion engine ECU 30. As will be described later, in this embodiment, the sensor current value acquired by the current value acquiring unit 12 is generally output as a PM current value without changing it. However, in some cases, a PM current value that is different from the acquired sensor current value is output. The PM current value may be output as a signal indicating the numerical value thereof, or as a current having a magnitude corresponding to the numerical value. In the latter case, the output unit 14 may output a current, or the output unit 14 may cause the particulate matter detection sensor 20 to output a current.

The heater control unit 15 controls energization of the heater 211. The heater control unit 15 performs the processing for burning the particulate matter deposited on the element part 200 using the heater 211 to remove it. This processing is also referred to as a "regeneration process" hereinafter.

The failure handling unit 16 performs the required fail-safe process when the state determining unit 13 determines that the sensor is in the "sensor failure state". The fail-safe process will be described later.

The process carried out when starting the vehicle MV will be described with reference to FIG. 5. FIG. 5 shows an example of how the temperature of the element part 200 changes with time in the period after starting the internal combustion engine 100. In this example, the heater control unit 15 energizes the heater 211 to heat the element part 200 with the heater 211 immediately after the internal combustion engine 100 is started. The temperature of the element part 200 rises and is maintained at a temperature T3 which is higher than the ambient temperature. This state continues until time t1 shown in FIG. 5.

In the period immediately after the start of the internal combustion engine 100, there tend to be water droplets on the inner surface of the exhaust pipe 130, and part of the water droplets may reach the element part 200 of the particulate matter detection sensor 20. If the temperature of the element part 200 is too high at this time, the water droplets may damage the element part 200. On the other hand, if the temperature of the element part 200 is too low, water droplets may adhere to the surface of the element part 200, and the contaminants contained in the water droplets may poison the element part 200.

Considering this, the temperature of the element part 200 in the period until time t1 is preferably lower than temperatures at which the water droplets cause damage to the element part 200, and is preferably a temperature at which the surface of the element part 200 repels water owing to the so-called Leidenfrost effect. Therefore, the temperature T3, which is the target temperature during this period, is preferably set within the range of 380 to 800 degrees Celsius.

When the temperature of the exhaust pipe 130 rises sufficiently, for example, to 100 degrees Celsius or higher, there tends to be no moisture on the inner surface of the exhaust pipe 130. The control device 10 therefore starts the regeneration process when it is confirmed by a sensor (not shown) that the temperature of the exhaust pipe 130 has reached 100 degrees Celsius or higher. The time t1 is the time at which the regeneration process starts.

In the regeneration process, the temperature of the element part 200 is further increased in order to burn and remove the particulate matter deposited on the detection surface 201. The target temperature of the element part 200 at this time is set at a temperature T4 which is higher than the temperature T3. However, if the target temperature is set too high, the excessive heating may result in damaging the element part 200, evaporation of the electrode material, or cause the contaminants to be fused to the element part 200. Accordingly, the target temperature of the element part 200 in the regeneration process is preferably set in the range of 650 to 800 degrees Celsius.

The duration of the regeneration process is a predetermined fixed period of time. Energization of the heater 211 is stopped after the regeneration process. In the example of FIG. 5, energization of the heater 211 is stopped at time t2, and the temperature of the element part 200 decreases after that. At time t3, the temperature of the element part 200 has dropped to a temperature slightly lower than the temperature of the exhaust gas surrounding it. In the period after time t3, a voltage is applied across the electrodes 221 and 231 of the particulate matter detection sensor 20, and a process for acquiring the value of the current flowing between them, that is, the sensor current value is carried out. This process is performed from time t3 at which application of voltage starts to time t4 which is a predetermined period of time after that. The process carried out during this period, that is, the process in which the current value acquiring unit 12 acquires the sensor current value, can be said to be a process of detecting the amount of deposited particulate matter on the element part 200.

When the temperature of the element part 200 is higher than the temperature of the exhaust gas at this time, a thermophoretic force is applied to the particulates floating around the detection surface 201 in a direction away from the detection surface 201. This hinders collection of the particulate matter to the detection surface 201. The reason for maintaining the current supplied to the heater 211 at 0 during the period after the time t3 is to prevent such a phenomenon.

After finishing the process of detecting the amount of deposited particulate matter, poisoning prevention control is performed. The time at which the poisoning prevention control is started is indicated as time t4 in FIG. 5.

The poisoning prevention control is control for preventing new particulates and contaminants that cause poisoning from adhering to the detection surface 201 by reheating the element part 200 with the heater 211. The target temperature of the element part 200 at this time is set at a temperature T2 which is lower than the temperature T4. The target temperature is preferably higher than the temperature of the exhaust gas at that time and equal to or lower than 800 degrees Celsius. The poisoning prevention control is continued until the next detection of the amount of deposition by the particulate matter detection sensor 20.

The above-described temperature adjustment of the element part 200 is performed by periodically acquiring the temperature of the element part 200 and adjusting it based on the acquired temperature. A dedicated temperature sensor may be provided to acquire the temperature of the element part 200. However, in this embodiment, it is assumed that the temperature of the element part 200 is substantially the same as the temperature of the heater 211, and the temperature of the element part 200 is acquired based on the resistance value of the heater 211.

As is well known, the higher the temperature of the element part 200, that is, the temperature of the heater 211, the greater the resistance value of the heater 211. The relationship between the two is measured in advance and stored in a storage device (not shown) of the control device 10 beforehand. The control device 10 acquires the current flowing through the heater 211 and the voltage applied to the heater 211 and calculates the resistance value of the heater 211 based on them. After that, the temperature of the heater 211, that is, the temperature of the element part 200 is acquired using the resistance value of the heater 211 and the stored relationship.

Note that the value of the voltage applied to the heater 211 can be calculated more accurately by using the potential at the connection part CP acquired via the sensing line 28. Since a known method can be used to calculate this, the specific method will not be described concretely.

In this embodiment, as described above, the regeneration process is performed after starting the internal combustion engine 100. However, the regeneration process may be performed at a different timing. For example, the regeneration process may be performed immediately before stopping the internal combustion engine 100 or while the internal combustion engine 100 is stopped.

Figure 6A:
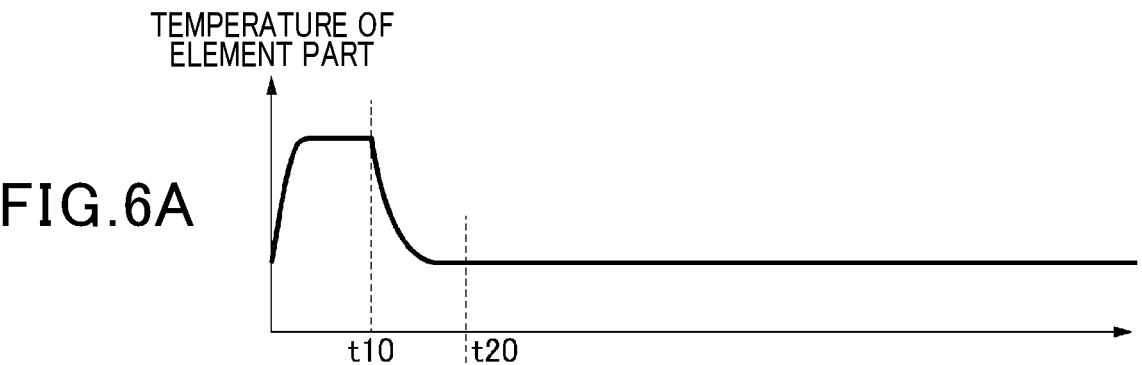
FIGS. 6A-6D are diagrams for explaining an outline of the control performed by the control device according to the first embodiment.

The control carried out by the control device 10 will be generally described with reference to FIG. 6. FIG. 6A shows how the temperature of the element part 200 changes with time. In the example show in FIG. 6, the time at which the regeneration process carried out using the heater 211 is completed is indicated as time t10. The period from time t10 to time t20 is a period for lowering the temperature of the element part 200, similarly to the period from time t2 to time t3 in FIG. 5. In the period after time t20, a voltage is applied across the electrodes 221 and 231 of the particulate matter detection sensor 20 to detect the amount of deposited particulate matter. As described earlier, since the heater 211 is not energized during this period, the temperature of the element part 200 is substantially constant.

Figure 6B:
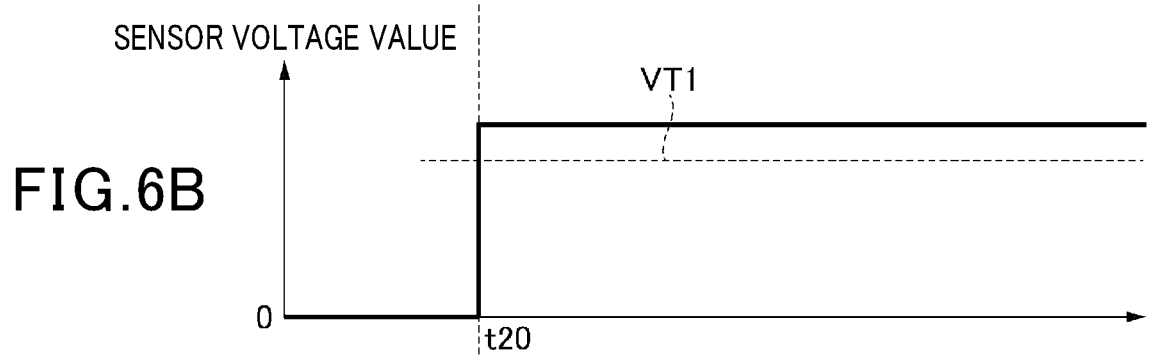

FIG. 6B shows an example of the change in the sensor voltage value acquired by the voltage value acquiring unit 11 with time. As shown in the figure, the sensor voltage value is 0 in the period before time t20. After time t20, the sensor voltage value is fixed at a certain value larger than 0 following the application of voltage across the electrodes 221 and 231.

Figure 6C:
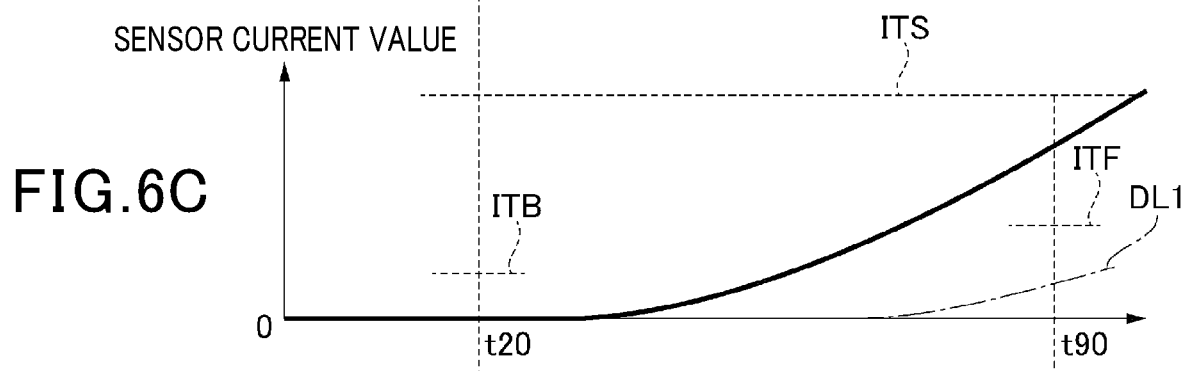

FIG. 6C shows an example of the change in the sensor current value acquired by the current value acquiring unit 12 with time. At time t20, the amount of particulate matter deposited on the element part 200 is approximately 0 due to the regeneration process that was being performed immediately before time t20. Therefore, even when a voltage is applied across the electrodes 221 and 231 at time t20, the sensor current value acquired at that time is approximately 0.

After that, as the amount of particulate matter deposited on the detection surface 201 of the element part 200 increases, the sensor current value gradually increases due to the conductivity of the particulate matter. The application of voltage across the electrodes 221 and 231 and the acquisition of the sensor current value are continued from time t20 to time t90 which is a predetermined period of time after time t20.

As described above, the larger the amount of deposited particulate matter, the larger the acquired sensor current value. In this embodiment, when the sensor current value acquired at time t90 is larger than a preset threshold ITF, it is determined that the sensor current value is larger than those acquired when the particle filter 110 is functioning normally. In other words, it is determined that the particle filter 110 is malfunctioning. The solid line in FIG. 6C shows the change in the sensor current value when the particle filter 110 is malfunctioning.

Figure 6D:
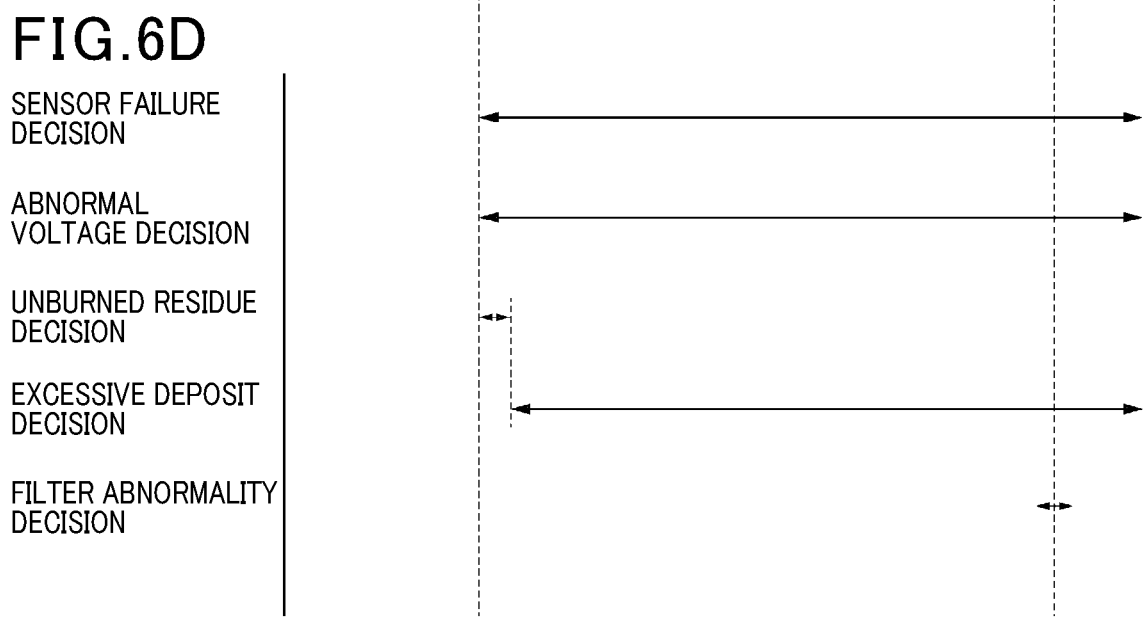

On the other hand, when the sensor current value acquired at time t90 is equal to or smaller than the preset threshold ITF, it is determined that the particle filter 110 is functioning normally. The alternate long and short dash line DL1 in FIG. 6C shows how the sensor current value changes when the particle filter 110 is functioning normally. The filter abnormality decision unit 31 of the internal combustion engine ECU 30 makes this decision by comparing the PM current value, which is a value corresponding to the sensor current value, with the threshold ITF. This decision is also referred to as "filter abnormality decision" hereinafter. FIG. 6D shows that the filter abnormality decision is performed at time t90.

Note that the length of the above-mentioned predetermined period, that is, the period from time t20 to time t90 during which voltage is applied is preferably not fixed, but changed as appropriate according to factors such as the operational state of the internal combustion engine 100. For example, when the efficiency of collecting particulate matter is low, such as when the temperature of the element part 200 is relatively high, the predetermined period may be changed to be longer than usual.

The change in the sensor voltage value and the change in the sensor current value with time shown in FIG. 6 are examples thereof in the case the particulate matter detection sensor 20 is not malfunctioning and operating normally. Examples of possible failure modes of the particulate matter detection sensor 20 will be described with reference to FIG. 7.

FIG. 7A schematically shows the control device 10, the particulate matter detection sensor 20, and the pair of detection lines 26 connecting them. The same applies to FIGS. 7B and 7C. As described above, the detection lines 26 are wires for applying voltage across the electrodes 221 and 231. In FIG. 7, one of the pair of detection lines 26 is depicted as a detection line 261 and the other is depicted as a detection line 262. The detection line 262 is the line that is always maintained at the ground potential.

FIG. 7A shows an example where there is a short circuit between the power supply and another element (hereinafter referred to as a short to power fault) in the particulate matter detection sensor 20. In this case, the detection line 261 and a power supply line VB are short-circuited. The power supply line VB is the source of voltage applied to components such as the heater 211. In this embodiment, the potential of the power supply line VB is 13 V. The potential of the detection line 261 when a voltage is being applied across the electrodes 221 and 231 is 35 V under normal conditions. When a short to power fault occurs as in FIG. 7A, an excessive amount of current flows from the detection line 261 to the power supply line VB as indicated by the arrow. As a result, a relatively large sensor current value is acquired even when no particulate matter is deposited on the element part 200.

FIG. 7B shows an example where there is a short to ground fault in the particulate matter detection sensor 20. In this case, the detection line 261 and a ground part GND are short-circuited. The ground part GND is a part with the ground potential, that is, 0 V. When a short to ground fault occurs as in FIG. 7B, an excessive amount of current flows from the detection line 261 to the ground part GND as indicated by the arrow. As a result, a relatively large sensor current value is acquired even when no particulate matter is deposited on the element part 200.

FIG. 7C shows an example where there is a short circuit between electrodes in the particulate matter detection sensor 20. In this case, the detection lines 261 and 262 are short-circuited. As described above, the detection line 262 is a line that is always maintained at the ground potential. When a short circuit between electrodes occurs as in FIG. 7C, an excessive amount of current flows from the detection line 261 to the detection line 262 as indicated by the arrow. As a result, a relatively large sensor current value is acquired even when no particulate matter is deposited on the element part 200.

As described above, regardless of whether the fault is a short to power fault, a short to ground fault, or a short circuit between electrodes, a relatively large sensor current value is acquired. Therefore, it may seem that whether the particulate matter detection sensor 20 has failed can be determined based on the sensor current value.

However, the sensor current value is large not only when the particulate matter detection sensor 20 has failed but also when a large amount of particulate matter is deposited on the element part 200. It is therefore difficult to accurately determine whether the sensor has failed based on only the sensor current value.

JP 2018-080655 A mentioned above states that the process of determining whether the sensor has failed based on the sensor current value is performed immediately after the regeneration process, that is, when it is presumed that no particulate matter is deposited on the element part 200. However, this method has an issue that, if the particulate matter detection sensor 20 fails after starting application of voltage across the electrodes, the failure cannot be accurately detected.

Likewise, if part of the particulate matter is not burned and remains immediately after the regeneration process, the method described in JP 2018-080655 A cannot accurately determine whether the particulate matter detection sensor 20 has failed. JP 2018-080655 A also describes that, to prevent such unburned residue from being generated, when the acquired sensor current value increases to a predetermined value, the application of voltage across the electrodes is stopped so that no more particulates are collected. However, in such a method, the acquired sensor current value is always equal to or smaller than the predetermined value regardless of the concentration of the particulate matter around the particulate matter detection sensor 20. This means that the amount of particulate matter cannot be accurately determined.

Taking these facts into account, the state determining unit 13 of the control device 10 according to the present embodiment determines the state of the particulate matter detection sensor 20 not only based on the sensor current value but also based on both the sensor current value and the sensor voltage value.

As described above, the potential of the detection line 261 is 35 V under normal conditions. This potential is higher than any of the potentials of the power supply line VB (13 V), the ground part GND (0 V), and the detection line 262 (0 V). Therefore, in all of the failure cases shown in FIG. 7, the acquired sensor voltage value will be lower than those acquired under normal conditions.

On the other hand, when there is no failure like the ones shown in FIG. 7, and the sensor current value is high due to the deposition of particulate matter on the element part 200, the acquired sensor voltage value is not low. By using both the sensor current value and the sensor voltage value, the state determining unit 13 can distinguish a state where the particulate matter detection sensor 20 has failed from a state where particulate matter is deposited on the element part 200. The former state is also referred to as a "sensor failure state" hereinafter. The latter state is also referred to as a "PM-deposited state" hereinafter.

The sensor failure state is a state where one of the faults described with reference to FIG. 7 has occurred in the particulate matter detection sensor 20, and the sensor current value is large because of that. On the other hand, the PM-deposited state is a state where there is no failure like the ones described above in the particulate matter detection sensor 20, and the sensor current value is large due to deposition of particulate matter on the element part 200 of the particulate matter detection sensor 20.

FIG. 8 shows examples of how the sensor voltage value and other items change with time when the particulate matter detection sensor 20 is malfunctioning, that is, in the sensor failure state. The items shown in FIGS. 8A, 8B, and 8C are the same as those shown in FIGS. 6A, 6B, and 6C.

A voltage is applied across the electrodes 221 and 231 of the particulate matter detection sensor 20 at time t20 also in the example of FIG. 8. As shown in FIG. 8B, in the sensor failure state, the acquired sensor voltage values are smaller than those in the case of FIG. 6B.

The voltage threshold value VT1 shown in FIG. 8B is a threshold value preset for the sensor voltage value in order to determine whether the sensor is in the sensor failure state. When the sensor is in the sensor failure state as in FIG. 8B, the sensor voltage value is smaller than the voltage threshold value VT1. On the other hand, when the sensor is not in the sensor failure state as in FIG. 6B, the sensor voltage value is equal to or higher than the voltage threshold value VT1. In other words, the voltage threshold value VT1 is preset so that it is between the sensor voltage value acquired when the sensor is in the sensor failure state and the sensor voltage value acquired when the sensor is not in the sensor failure state.

As shown in FIG. 8C, in the sensor failure state, a large sensor current value is acquired after time t20 at which a voltage is applied across the electrodes 221 and 231 of the particulate matter detection sensor 20.

The current threshold value ITS shown in FIG. 8C is a threshold value preset for the sensor current value in order to determine whether the sensor is in the sensor failure state.

When the sensor is in the sensor failure state as in FIG. 8C, the sensor current value is equal to or greater than the current threshold value ITS. On the other hand, when the sensor is not in the sensor failure state as in FIG. 6C and the amount of deposited particulate matter is small, the sensor current value is smaller than the current threshold value ITS. In other words, the current threshold value ITS is preset so that it is between the sensor current value acquired when the sensor is in the sensor failure state and the sensor current value acquired when the sensor is not in the sensor failure state. In this embodiment, the current threshold value ITS is set at a value that is slightly smaller than the maximum possible sensor current value.

When the sensor current value is equal to or greater than the predetermined current threshold value ITS and the sensor voltage value is smaller than the predetermined voltage threshold value VT1, the state determining unit 13 determines that the sensor is in the sensor failure state like the examples shown in FIG. 7. The above-described process of determining whether the sensor is in the sensor failure state is also referred to as "sensor failure decision" hereinafter. As shown in FIG. 6D, the sensor failure decision is continuously performed from time t20 at which a voltage is applied across the electrodes 221 and 231 of the particulate matter detection sensor 20. That is, the sensor failure decision is continuously performed while the process of detecting the amount of deposited particulate matter is being performed.

FIG. 8E shows how the result of the sensor failure decision changes with time. In the example of FIG. 8, at time t21 immediately after time t20, the sensor is determined to be in the sensor failure state based on the sensor voltage value and the sensor current value acquired at that time.

FIG. 9 shows examples of how items such as the sensor voltage value change with time in a case where there is unburned residue of particulate matter in the particulate matter detection sensor 20 when the regeneration process is completed. The state where there are remaining particulates on the element part 200 that were not removed by the regeneration process is also referred to as an "unburned residue state" hereinafter. The unburned residue state can be considered as a mode included in the PM-deposited state described above. The items shown in FIGS. 9A, 9B, and 9C are the same as those shown in FIGS. 6A, 6B, and 6C. FIG. 9B shows an example where the particulate matter detection sensor 20 has not failed.

A voltage is applied across the electrodes 221 and 231 of the particulate matter detection sensor 20 at time t20 also in the example of FIG. 9. Since the sensor is not in the sensor failure state, as shown in FIG. 8B, the acquired sensor voltage value is equal to or greater than the voltage threshold value VT1 at this time.

As shown in FIG. 9C, in the unburned residue state, a large sensor current value is acquired after time t20 at which a voltage is applied across the electrodes 221 and 231 of the particulate matter detection sensor 20.

The current threshold value ITB shown in FIG. 9C is a threshold value preset for the sensor current value to determine whether the sensor is in the unburned residue state. When the sensor is in the unburned residue state as in FIG. 9C, the sensor current value at time t20 is equal to or greater than the current threshold value ITB. On the other hand, when the sensor is not in the unburned residue state as in FIG. 6C, the sensor current value at time t20 is smaller than the current threshold value ITB. In other words, the current threshold value ITB is preset so that it is between the sensor current value acquired when the sensor is in the unburned residue state and the sensor current value acquired when the sensor is not in the unburned residue state.

In this embodiment, the current threshold value ITB is set as a value that is smaller than the current threshold value ITS. Alternatively, the current threshold value ITS, which is a threshold value for determining whether the sensor is in the sensor failure state, and the current threshold value ITB, which is a threshold value for determining whether the sensor is in the unburned residue state, may be set to the same value.

When the sensor current value is equal to or greater than the predetermined current threshold value ITB and the sensor voltage value is equal to or greater than the predetermined voltage threshold value VT1 as in the example of FIG. 9, the state determining unit 13 determines that the sensor is in the PM-deposited state in which particulate matter is deposited. In particular, when it is determined that the sensor is in the PM-deposited state instead of the sensor failure state at a timing immediately after time t20 at which the voltage is applied across the electrodes 221 and 231, the state determining unit 13 determines that, more specifically, the PM-deposited state is the unburned residue state. This timing can also be expressed as the timing at which the current value acquiring unit 12 starts acquiring the sensor current value, that is, the timing immediately after the start of detection of the amount of deposited particulate matter.

The above-described process of determining whether the sensor is in the unburned residue state is also referred to as "unburned residue decision" hereinafter. As shown in FIG. 6D, the unburned residue decision is performed at time t20 at which a voltage is applied across the electrodes 221 and 231 of the particulate matter detection sensor 20.

FIG. 9F shows how the result of the unburned residue decision changes with time. In the example of FIG. 9, at time t21 immediately after time t20, the sensor is determined to be in the unburned residue state based on the sensor voltage value and the sensor current value acquired at that time.

When the state determining unit 13 determines that the sensor is in the unburned residue state, the heater control unit 15 carries out the regeneration process again to remove the particulate matter from the element part 200. In the example of FIG. 9, as shown in FIG. 9A, the second regeneration process is executed in the period from time t21 to time t22. No voltage is applied across the electrodes 221 and 231 at time t21.

After that, when the temperature of the element part 200 becomes low, a voltage is applied across the electrodes 221 and 231 at time t23. In the example of FIG. 9, as shown in FIG. 9B, the sensor voltage value acquired at time t24 immediately after time t23 is equal to or greater than the voltage threshold voltage VT1, and, as shown in FIG. 9C, the sensor current value acquired at time t24 is smaller than the current threshold value ITB. In this case, it is presumed that the unburned particulates have been completely burned and removed by the second regeneration process. As shown in FIG. 9F, the state determining unit 13 determines that the sensor is not in the unburned residue state but in a state where the particulates have been completely burned after time t24.

If it is determined that the sensor is in the unburned residue state again after the regeneration process, the unburned residue decision and the regeneration process are performed again. In the present embodiment, the unburned residue decision and the regeneration process are repeated until it is determined that the sensor is no longer in the unburned residue state.

A substance other than particulate matter that cannot be removed by combustion may adhere to the element part 200. An example of such a substance is iron powder. The acquired sensor current value also increases when a substance such as iron powder adheres to the element part 200. Therefore, it is determined that the sensor is in the unburned residue state as with the case shown in FIG. 9, and the regeneration process is executed again.

FIG. 10 shows an example where iron powder is attached to the element part 200 as described above and the regeneration process is repeated multiple times. The items shown in FIGS. 10A, 10B, 10C, and 10F are the same as those shown in FIGS. 9A, 9B, 9C, and 9F. In the example of FIG. 10, the regeneration process is repeated at time t21, t24, t27, and t30. As shown in FIG. 10B, the sensor voltage value acquired when voltage is applied across the electrodes 221 and 231 after each regeneration process is equal to or greater than the voltage threshold value VT1.

However, since the substance attached to the element part 200 is nonflammable, the substance will not be removed even if the regeneration process is repeated. Therefore, the sensor current values acquired at the above timings are all equal to or higher than the current threshold value ITB, and, as shown in FIG. 10F, it is repeatedly determined that there is unburned residue of particulate matter.

In the present embodiment, the number of times the regeneration process is performed is limited in order to prevent the regeneration process from being repeated forever. In the present embodiment, when the decision of the state determining unit 13 that the sensor is in the unburned residue state and execution of the regeneration process by the heater control unit 15 are repeated a predetermined number of times, and it is still determined that the sensor is in the unburned residue state, the state determining unit 13 determines that a nonflammable substance is attached to the element part 200. In this embodiment, the predetermined number of times is set at "5".

FIG. 10G shows how the count value of the number of times the regeneration process is performed changes. The state determining unit 13 determines that a nonflammable substance is attached to the element part 200 when the count value reaches 5. This decision process is also referred to as "nonflammable substance adherence decision" hereinafter. FIG. 10H shows how the result of the nonflammable substance adherence decision changes with time. In the example of FIG. 8, the state determining unit 13 determines that a nonflammable substance is attached to the element part 200 when the count value reaches 5 at time t33. After that, the heater control unit 15 does not perform the regeneration process.

FIG. 11 shows an example where the particulate matter detection sensor 20 has failed during the process of detecting the amount of deposited particulate matter, specifically, at time t40. The items shown in FIGS. 11A, 11B, 11C, and 11E are the same as those shown in FIGS. 8A, 8B, 8C, and 8E.

The particulate matter detection sensor 20 is operating normally in the period before time t40. Therefore, as shown in FIG. 11B, the sensor voltage values acquired during this period are equal to or greater than the voltage threshold value VT1. In addition, as shown in FIG. 11C, the sensor current values acquired during this period are smaller than the current threshold value ITS.

When the particulate matter detection sensor 20 fails at time t40, the sensor voltage value becomes smaller than the voltage threshold value VT1 as shown in FIG. 11B, and the sensor current value becomes equal to or greater than the current threshold value ITS as shown in FIG. 11C.

The sensor failure decision is continuously performed while the process of detecting the amount of deposited particulate matter is being performed. In the example of FIG. 11, as shown in FIG. 11E, at time t41 immediately after time t40, the sensor is determined to be in the sensor failure state based on the sensor voltage value and the sensor current value acquired at that time.

FIG. 12 shows an example where there is a relatively large amount of particulate matter around the particulate matter detection sensor 20 and the rate of deposition onto the element part 200 is high. The items shown in FIGS. 12A, 12B, and 12C are the same as those shown in FIGS. 6A, 6B, and 6C.

FIG. 12 shows an example where the particulate matter detection sensor 20 has not failed. Therefore, as shown in FIG. 12B, the sensor voltage value is equal to or greater than the voltage threshold value VT1 after time t20 at which a voltage is applied across the electrodes 221 and 231.

As shown in FIG. 12C, the sensor current value increases at a high rate and exceeds the current threshold value ITS at time t50. This time t50 is a time before the time t90 shown in FIG. 6. That is, in the example of FIG. 12, the sensor current value exceeds the current threshold value ITS before the predetermined period for the process of detecting the amount of deposited particulate matter elapses.

The maximum value IM shown in FIG. 12C is the maximum value that can be acquired as the sensor current value. As mentioned earlier, the current threshold value ITS of the present embodiment is set as a value that is slightly smaller than this maximum value IM. Therefore, it can be said that, when the sensor current value is higher than the current threshold value, the sensor current value cannot further increase even if the amount of particulate matter on the element part 200 increases. Such a state is also referred to as an "excessive deposit state" hereinafter. The excessive deposition state can be considered as a mode included in the PM-deposited state described above.

After it has been determined that the sensor is not in the sensor failure state, if the sensor voltage value becomes equal to or higher than the predetermined voltage threshold value VT1 while the process of detecting the amount of deposited particulate matter is being performed, the state determining unit 13 can determine that the sensor is in the excessive deposit state. This process of determining whether the sensor is in the excessive deposit state is also referred to as "excessive deposit decision" hereinafter. As shown in FIG. 6D, the excessive deposit decision is started immediately after the unburned residue decision is completed, and is performed continuously. That is, the excessive deposit decision is continuously performed in the period in which the process of detecting the amount of deposited particulate matter is being performed and after the unburned residue decision is completed.

When the acquired sensor current value is equal to or higher than a predetermined upper limit value, the state determining unit 13 determines that the sensor is in the excessive deposit state. In this embodiment, the current threshold value ITS is used as the "upper limit value" as described above. Instead of this, the upper limit value used for the excessive deposit decision and the current threshold value ITS used for the sensor failure decision may be set as different values.

FIG. 12E shows how the result of the excessive deposit decision changes with time. In the example of FIG. 12, at time t51 immediately after time t50, the sensor is determined to be in the excessive deposit state based on the sensor voltage value and the sensor current value acquired at that time.

When the power supply circuit (not shown) for applying voltage across the electrodes 221 and 231 fails, a sufficient voltage may not be applied across the electrodes 221 and 231 even if the particulate matter detection sensor 20 is operating normally. Such a state is also referred to as an "abnormal voltage state" hereinafter. FIG. 13 shows an example where the sensor is in the abnormal voltage state. The items shown in FIGS. 13A, 13B, and 13C are the same as those shown in FIGS. 6A, 6B, and 6C. FIG. 13 shows an example where the particulate matter detection sensor 20 has not failed.

In the example of FIG. 13, as shown in FIG. 13B, the sensor voltage value is smaller than the voltage threshold value VT1 after time t20 at which a voltage is applied across the electrodes 221 and 231 due to, for example, a failed power supply circuit. In addition, as shown in FIG. 13B, the sensor current values acquired after time t20 are about 0 and smaller than the current threshold value ITS.

When the sensor current value is smaller than the predetermined current threshold value ITS and the sensor voltage value is smaller than the predetermined voltage threshold value VT1, the state determining unit 13 determines that the sensor is in a state where a sufficient voltage cannot be applied across the electrodes 221 and 231, that is, the abnormal voltage state. This process of determining whether the sensor is in the abnormal voltage state is also referred to as "abnormal voltage decision" hereinafter. As shown in FIG. 6D, the abnormal voltage decision is continuously performed from time t20 at which a voltage is applied across the electrodes 221 and 231 of the particulate matter detection sensor 20. That is, the abnormal voltage decision is continuously performed while the process of detecting the amount of deposited particulate matter is being performed.

FIG. 13J shows how the result of the abnormal voltage decision changes with time. In the example of FIG. 13, at time t21 immediately after time t20, the sensor is determined to be in the abnormal voltage state based on the sensor voltage value and the sensor current value acquired at that time.

In the example of FIG. 13, the sensor is in the abnormal voltage state from the beginning, that is, the time t20 when a voltage is applied across the electrodes 221 and 231. However, the abnormal voltage state may occur after the application of voltage across the electrodes 221 and 231. FIG. 14 shows an example where the abnormal voltage state has occurred during the process of detecting the amount of deposited particulate matter, specifically, at time t60. The items shown in FIGS. 14A, 14B, 14C, and 14J are the same as those shown in FIGS. 13A, 13B, 13C, and 13J.

The power supply circuit is operating normally in the period before time t60. Therefore, as shown in FIG. 14B, the sensor voltage values acquired during this period are equal to or greater than the voltage threshold value VT1. In addition, as shown in FIG. 14C, the sensor current values acquired during this period are smaller than the current threshold value ITS.

When the particulate matter detection sensor 20 fails at time t60, the sensor voltage value becomes smaller than the voltage threshold value VT1 as shown in FIG. 14B. On the other hand, as shown in FIG. 14C, the sensor current value remains smaller than the current threshold value ITS after time t60.

The abnormal voltage decision is continuously performed while the process of detecting the amount of deposited particulate matter is being performed. In the example of FIG. 14, as shown in FIG. 14J, at time t61 immediately after time t60, the sensor is determined to be in the abnormal voltage state based on the sensor voltage value and the sensor current value acquired at that time.

As described above, the state determining unit 13 performs various processes each for determining whether the particulate matter detection sensor 20 is in one of the various states. FIG. 15 shows a table in which the specifics of the various decision processes are briefly summarized on a condition-by-condition basis.

As shown in row (A) of FIG. 15, when the sensor current value is equal to or higher than the current threshold value ITS (that is, "excessive") and the sensor voltage value is lower than the voltage threshold voltage VT1 (that is, "decreased") while the amount of deposited particulate matter is being detected, it is determined that the sensor is in the sensor failure state.

As shown in row (B) of FIG. 15, when the sensor current value is equal to or higher than the current threshold ITB (that is, "excessive") and the sensor voltage value is equal to or higher than the voltage threshold voltage VT1 (that is, "normal") immediately after the start of detection of the amount of deposited particulate matter, it is determined that the sensor is in the unburned residue state. Further, as shown in row (C) of FIG. 15, when the decision that the sensor is in the unburned residue state is repeated a plurality of times, it is determined that a nonflammable substance is attached to the element part 200.

As shown in row (D) of FIG. 15, when the sensor current value is equal to or higher than the current threshold value ITS (that is, "excessive") and the sensor voltage value is equal to or higher than the voltage threshold voltage VT1 (that is, "normal") in the period during which the amount of deposited particulate matter is detected, excluding immediately after the start of this detection, it is determined that the sensor is in the excessive deposit state.

As shown in row (E) of FIG. 15, when the sensor current value is lower than the current threshold value ITS (that is, "normal") and the sensor voltage value is lower than the voltage threshold voltage VT1 (that is, "reduced") while the amount of deposited particulate matter is being detected, it is determined that the sensor is in the abnormal voltage state.

As shown in row (F) of FIG. 15, when the sensor current value is lower than the current threshold value ITS (that is, "normal") and the sensor voltage value is equal to or higher than the voltage threshold voltage VT1 (that is, "normal") while the amount of deposited particulate matter is being detected, that is, when none of the above-described abnormal states is confirmed, it is determined that the particulate matter detection sensor 20 and other aspects are in normal condition.

Figure 16:
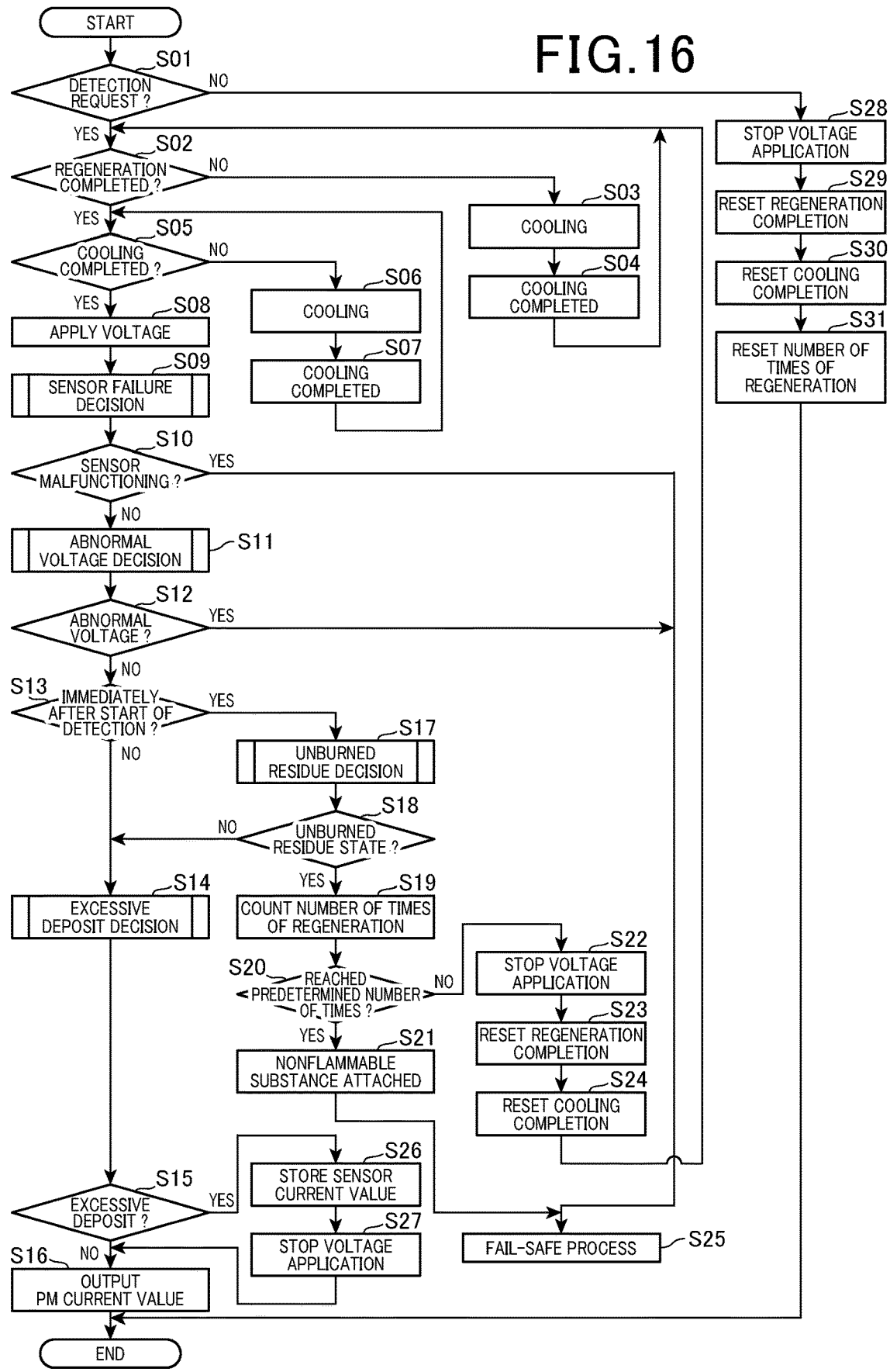
FIG. 16 is a flowchart showing the flow of a process carried out by the control device according to the first embodiment.

The specific flow of the process carried out by the control device 10 to implement the above-described various decision will be described with reference to FIG. 16. The process shown in FIG. 16 is carried out repeatedly by the control device 10 every time a predetermined control interval elapses.

In the first step S01, whether there is a detection request is determined. The "detection request" is a signal requesting detection of particulate matter by the particulate matter detection sensor 20. In the present embodiment, the internal combustion engine ECU 30 sends the detection request. The following process required for the particulate matter detection is executed only when the control device receives this detection request. If a detection request is transmitted from the internal combustion engine ECU 30, the process proceeds to step S02.

In step S02, it is determined whether the regeneration process is completed. In the control device 10, a regeneration completion flag is provided as a variable for storing whether the regeneration process is completed. If the regeneration process is completed, 1 is stored as the value of the regeneration completion flag, and if the regeneration process is not completed, 0 is stored as the value of the regeneration completion flag.

When the value of the regeneration completion flag is 0, the process proceeds to step S03. In step S03, the heater control unit 15 performs the regeneration process. As described with reference to FIG. 5, in the regeneration process, the element part 200 is heated by the heater 211 and kept at a high temperature for a predetermined fixed period of time.

After the fixed period of time has passed, the process proceeds to step S04. In step S04, the energization of the heater 211 is stopped, and the value of the regeneration completion flag is changed to 1. After that, the process proceeds to step S02.

In step S02, when the value of the regeneration completion flag is 1, the process proceeds to step S05. In step S05, it is determined whether the cooling of the element part 200 is completed. The control device 10 is provided with a cooling completion flag as a variable for storing whether the cooling of the element part 200 is completed. If the cooling of the element part 200 is completed, 1 is stored as the value of the cooling completion flag, and if the cooling of the element part 200 is not completed, 0 is stored as the value of the cooling completion flag.

When the value of the cooling completion flag is 0, the process proceeds to step S06. In step S06, the temperature of the element part 200 is acquired, and the process waits until the temperature drops below a predetermined target temperature. The target temperature is set at a temperature that is lower than the temperature of the exhaust gas in advance. When the temperature of the element part 200 drops below the target temperature, the process proceeds to step S07. In step S07, the value of the cooling completion flag is changed to 1. After that, the process proceeds to step S05.

In step S05, when the value of the cooling completion flag is 1, the process proceeds to step S08. In step S08, a voltage is applied across the electrodes 221 and 231. In step S09 following step S08, the sensor failure decision is made by the state determining unit 13. As described above, the sensor failure decision is a process of determining whether the sensor is in the sensor failure state. The specific process of the sensor failure decision will be described later.

In step S10 following step S09, it is determined whether the result of the sensor failure decision in step S09 has been the sensor failure state. If the result is the sensor failure state, the process proceeds to step S25 described later. If the result is not the sensor failure state, the process proceeds to step S11.

In step S11, the state determining unit 13 makes the abnormal voltage decision. As described above, the abnormal voltage decision is a process of determining whether the sensor is in the abnormal voltage state. The specific process of the abnormal voltage decision will be described later.

In step S12 following step S11, it is determined whether the result of the abnormal voltage decision in step S11 has been the abnormal voltage state. If the result is the abnormal voltage state, the process proceeds to step S25 described later. If the result is not the abnormal voltage state, the process proceeds to step S13.

In step S13, it is determined whether it is immediately after the start of detection of the amount of deposited particulate matter. If it is the first time the process has proceeded to step S13 after the start of voltage application in step S08, it is determined that it is immediately after the start of detection of the amount of deposit, and the process proceeds to step S17. If it is not the first time the process has proceeded to step S13 after the start of voltage application in step S08, that is, if the processing of step S17 described below has already been performed, the process proceeds to step S14 described later.

In step S17, the unburned residue decision is made. As described above, the unburned residue decision is a process of determining whether the sensor is in the unburned residue state. The specific process of the unburned residue decision will be described later.

In step S18 following step S17, it is determined whether the result of the unburned residue decision in step S17 has been the unburned residue state. If the result is the unburned residue state, the process proceeds to step S19. If the result is not the unburned residue state, the process proceeds to step S14 described later.

In step S19, the count value of the number of times the regeneration process has been performed in increased by 1. This count value is the value described with reference to FIG. 10G. In step S20 following step S19, it is determined whether the count value has reached a predetermined number of times. As mentioned above, the predetermined number of times is set at 5 in this embodiment. If the count value has reached the predetermined number of times, the process proceeds to step S21.

In step S21, it is determined that a nonflammable substance is attached to the element part 200. The procedures performed in steps S20 and S21 corresponds to the nonflammable substance adherence decision described with reference to FIG. 10. After step S21, the process proceeds to step S25.

If the count value has not reached the predetermined number of times in step S20, the process proceeds to step S22. In step S22, the application of voltage across the electrodes 221 and 231 is stopped. In step S23 following step S22, the value of the regeneration completion flag is reset back to 0. In step S24 following step S23, the value of the cooling completion flag is reset back to 0. After step S24, the procedures of step S02 and the following steps are performed. Thus, when the count value of the number of times the regeneration process is performed has not reached the predetermined number of times, and it is determined that the sensor is in the unburned residue state, the regeneration process is repeated.

If it is not immediately after the start of detection of the amount of deposited particulate matter in step S13, that is, it is not the first time the process has proceeded to step S13, the process proceeds to step S14. In step S14, the state determining unit 13 makes the excessive deposit decision. As described above, the excessive deposit decision is a process of determining whether the sensor is in the excessive deposit state. The specific process of the excessive deposit decision will be described later.

In step S15 following step S14, it is determined whether the result of the excessive deposit decision in step S14 has been the excessive deposit state. If the result is not the excessive deposit state, the process proceeds to step S16 described later. If the result is the excessive deposit state, the process proceeds to step S26. In step S26, the sensor current value acquired by the current value acquiring unit 12 at this time is stored in a storage device (not shown) of the control device 10. In step S27 following step S26, the application of voltage across the electrodes 221 and 231 is stopped. After that, the process proceeds to step S16.

In step S16, the output unit 14 outputs the PM current value to the filter abnormality decision unit 31 of the internal combustion engine ECU. In the case the process has directly proceeded from step S15 to step S16, the sensor current value acquired by the current value acquiring unit 12 is directly output as the PM current value. The sensor current value may either be a sensor current value acquired in a previous step or a sensor current value acquired after proceeding to step S16. Further, although the output PM current value may be the same value as the acquired sensor current value, it may also be a value different from the sensor current value as long as it is based on the sensor current value. For example, the PM current value may be a value based on the acquired sensor current value, such as a value obtained by correcting the acquired sensor current value.

On the other hand, in the case the process has proceeded from step S15 to step S16 via steps S26 and S27, the sensor current value stored in step S26 is output as the PM current value. As with the above case, the output PM current value may be the same value as the stored sensor current value, or a value different from the stored sensor current value as long as it is based on the sensor current value. For example, the PM current value may be a value based on the stored sensor current value, such as a value obtained by correcting the stored sensor current value.

If a detection request is not transmitted from the internal combustion engine ECU 30 in step S01, the process proceeds to step S28. In step S28, the application of voltage across the electrodes 221 and 231 is stopped. If the voltage application is already stopped, that state is maintained.

In step S29 following step S28, the value of the regeneration completion flag is reset back to 0. In step S30 following step S29, the value of the cooling completion flag is reset back to 0. In step S31 following step S30, the count value of the number of times the regeneration process has been performed is reset back to 0. After that, the process shown in FIG. 16 is terminated.

If it is determined that the sensor is in the sensor failure state in step S09, if it is determined that the sensor is in the abnormal voltage state in step S11, or if it is determined that a nonflammable substance is attached to the element part 200 in step S21, the process proceeds to step S25. In step S25, the failure handling unit 16 performs the fail-safe process. The fail-safe process is performed according to the mode of the abnormality. The fail-safe process includes notifying the occupants of the vehicle MV of the occurrence of an abnormality and the mode of the abnormality. It also includes storing the values of parameters such as the sensor current value and the sensor voltage value at the present time as information acquired when there is an abnormality. It further includes forbidding procedures such as energization of the heater 211 thereafter. After the fail-safe process in step S25, the process shown in FIG. 16 is will not be performed.

Figure 17:
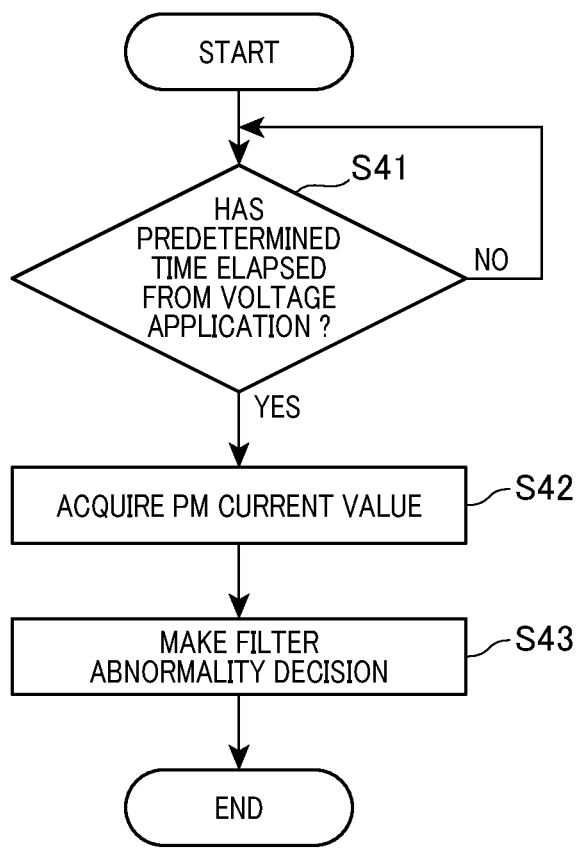
FIG. 17 is a flowchart showing the flow of a process carried out by the internal combustion engine ECU.

The process shown in FIG. 17 is carried out repeatedly by the internal combustion engine ECU 30. This process is carried out repeatedly by the filter abnormality decision unit 31 of the internal combustion engine ECU 30 every time a predetermined control interval elapses, in parallel with the process shown in FIG. 16. However, the process of FIG. 17 is repeatedly performed only in the period after the start of voltage application across the electrodes 221 and 231 in step S08 of FIG. 16. When the application of voltage across the electrodes 221 and 231 is stopped in step S22, S27, or another step, the process of FIG. 17 will not be performed thereafter.

In the first step S41 of FIG. 17, it is determined whether a predetermined period has passed from the start of voltage application in step S08 of FIG. 16. This "predetermined period" is the period from time t20 to t90 in the example of FIG. 6C. If the predetermined period has not passed, step S41 is repeated. If it is determined that the predetermined period has passed, the process proceeds to S42.

In step S42, the PM current value is acquired. The PM current value acquired in this step is the PM current value output in step S16 of FIG. 16. As described above, the PM current value acquired in step S42 is basically the sensor current value at the present time acquired by the current value acquiring unit 12. However, if the particulate matter detection sensor 20 is in the excessive deposit state, a sensor current value stored in advance before the voltage application was stopped is acquired as the PM current value in step S42.

In step S43 following step S42, based on the PM current value acquired in step S42, whether there is an abnormality with the particle filter 110 is determined, that is, the above-described "filter abnormality decision" process is carried out. As described above with reference to FIG. 6C, if the PM current value based on the sensor current value is larger than the threshold value ITF, it is determined that the sensor current value is larger than those acquired when the particle filter 110 is functioning normally, in other words, it is determined that the detected amount of deposit is large. In this case, it is determined that there is an abnormality with the particle filter 110 as a result of the filter abnormality decision. At this time, a fail-safe process similar to that performed in step S25 of FIG. 16 may be performed. On the other hand, if the PM current value based on the sensor current value is equal to or lower than the threshold value ITF, it is determined that the detected amount of deposit is small. In this case, it is determined that the particle filter 110 is functioning normally from the filter abnormality decision.

Accordingly, if the state determining unit 13 does not determine that the sensor is in the unburned residue state, that is, if the answer is No in step S18 of FIG. 16, the filter abnormality decision unit 31 of the internal combustion engine ECU 30 performs the filter abnormality decision process based on a PM current value that is the sensor current value acquired when a predetermined period of time has passed from the start of application of voltage across the electrodes 221 and 231.

If the state determining unit 13 determines that the sensor is in the excessive deposit state, that is, if the answer is Yes in step S15 of FIG. 16, a component of the control device 10, for example, the current value acquiring unit 12 changes the voltage applied across the electrodes 221 and 231 to 0 after storing the sensor current value (steps S26 and S27 of FIG. 16). This prevents a voltage continuing to be applied across the electrodes 221 and 231 of the element part 200 in the excessive deposit state.

After the voltage applied across the electrodes 221 and 231 is changed to 0, the sensor current value acquired by the current value acquiring unit 12 also becomes 0. Therefore, if the filter abnormality decision is always made based on a PM current value that is the same as the sensor current value acquired by the current value acquiring unit 12, the PM current value will be lower than the threshold value ITF, and the sensor may be erroneously determined not to be in the PM-deposited state even if it is actually in the excessive deposit state.

To address this issue, after the voltage application is stopped in step S27 of FIG. 16, the output unit 14 of the present embodiment outputs a PM current value based on a stored sensor current value. This prevents the sensor being erroneously determined not to be in the PM-deposited state even when it is actually in the excessive deposit state.

As described above, in a method described in JP 2018-080655 A, to prevent generation of unburned residue, when the acquired sensor current value increases to a predetermined value, the application of voltage across the electrodes is stopped so that no more particulates are collected. On the other hand, in the present embodiment, except when the regeneration process is repeated because there is unburned residue, or when the sensor is in the excessive deposit state, the application of voltage across the electrodes 221 and 231 is not stopped while the amount of deposited particulate matter is being detected. This makes it possible to accurately determine the amount of particulate matter around the particulate matter detection sensor 20.

Figure 18:
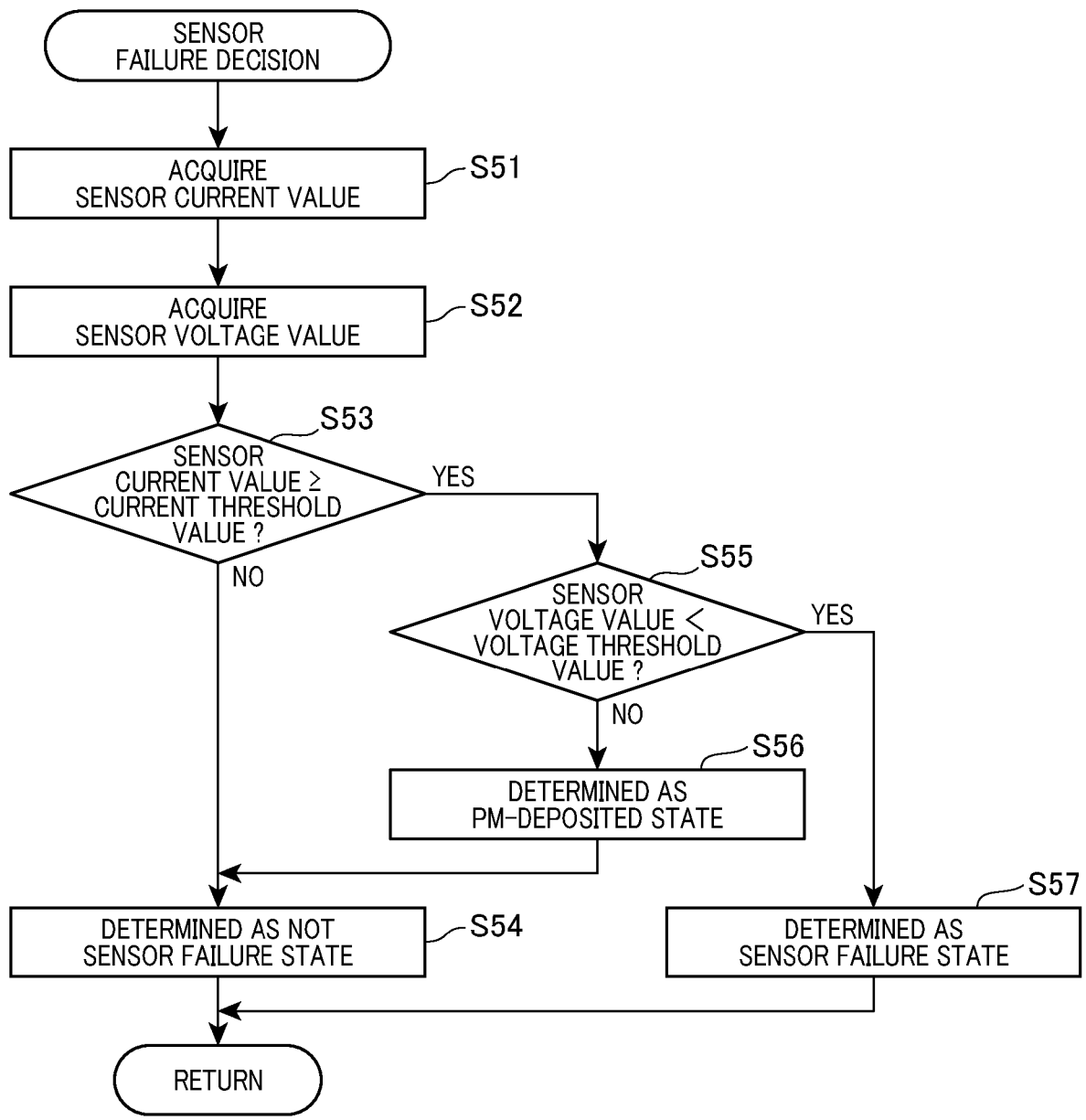
FIG. 18 is a flowchart showing the flow of a process carried out by the control device according to the first embodiment.

The specific process carried out to make the sensor failure decision will be described with reference to FIG. 18. The flowchart shown in FIG. 18 shows the specific flow of the process carried out to make the sensor failure decision in step S09 of FIG. 16. The process shown in FIG. 18 is carried out by the state determining unit 13.

In the first step S51 of the sensor failure decision, the current value acquiring unit 12 acquires the sensor current value. In step S52 following step S51, the voltage value acquiring unit 11 acquires the sensor voltage value.

In step S53 following step S52, it is determined whether the sensor current value acquired in step S51 is equal to or larger than the current threshold value ITS. If the sensor current value is smaller than the current threshold value ITS, the process proceeds to step S54. In step S54, it is determined that the sensor is not in the sensor failure state.

If the sensor current value is equal to or larger than the current threshold value ITS in step S53, the process proceeds to step S55. In step S55, it is determined whether the sensor voltage value acquired in step S52 is smaller than the voltage threshold value VT1. If the sensor voltage value is equal to or larger than the voltage threshold value VT1, the process proceeds to step S56.

The fact that the process has proceeded to step S56 means that the sensor current value is excessive and the sensor voltage value is normal. Therefore, it is determined in step S56 that the particulate matter detection sensor 20 is in the PM-deposited state. Note that, although this PM-deposited state may be the excessive deposit state in particular, whether it is the excessive deposit state will not be determined here. After step S56, the process proceeds to step S54 described above.

If the sensor voltage value is smaller than the voltage threshold value VT1 in step S55, the process proceeds to step S57. In step S57, it is determined that the sensor is in the sensor failure state.

In summary, when the sensor current value is equal to or greater than the predetermined current threshold value ITS and the sensor voltage value is smaller than the predetermined voltage threshold value VT1, the state determining unit 13 determines that the sensor is in the sensor failure state. When the sensor current value is equal to or greater than the current threshold value ITS and the sensor voltage value is equal to or greater than the predetermined voltage threshold value VT1, the state determining unit 13 determines that the sensor is in the PM-deposited state in step S56. That is, the state determining unit 13 can determine whether the sensor is in the sensor failure state, the PM-deposited state, or neither of these states based on the sensor voltage value and the sensor current value.

Figure 19:
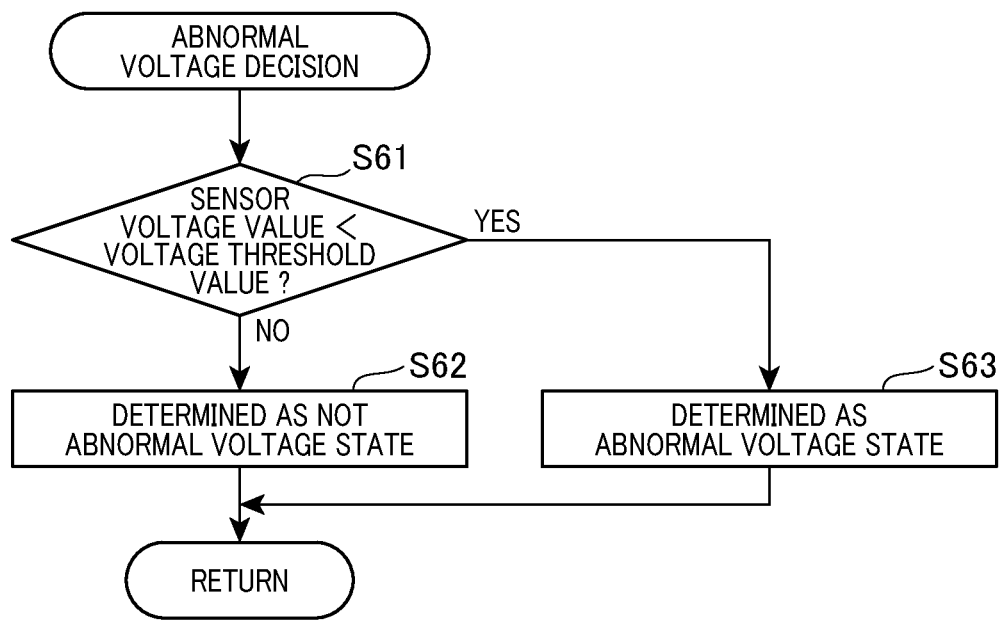
FIG. 19 is a flowchart showing the flow of a process carried out by the control device according to the first embodiment.

The flow of the specific process carried out to make the abnormal voltage decision will be described with reference to FIG. 19. The flowchart shown in FIG. 19 shows the specific flow of the process carried out to make the abnormal voltage decision in step S11 of FIG. 16. The process shown in FIG. 19 is carried out by the state determining unit 13.

In the first step S61 of the abnormal voltage decision, it is determined whether the sensor voltage value is smaller than the voltage threshold value VT1. The sensor voltage value used here is the sensor voltage value acquired in step S52 of FIG. 18. Instead, a new sensor voltage value may be acquired by the voltage value acquiring unit 11 when the abnormal voltage decision process is performed.

If the sensor voltage value is equal to or larger than the voltage threshold value VT1 in step S61, the process proceeds to step S62. In step S62, it is determined that the sensor is not in the abnormal voltage state. If the sensor voltage value is smaller than the voltage threshold value VT1 in step S61, the process proceeds to step S63. In step S63, it is determined that the sensor is in the abnormal voltage state.

Note that the abnormal voltage decision shown in FIG. 19 is made when it is determined in step S10 of FIG. 16 that the sensor is not in the sensor failure state. Therefore, the sensor current value is smaller than the current threshold value ITS at the beginning of the process of FIG. 19.

Accordingly, when the sensor current value is smaller than the predetermined current threshold value ITS and the sensor voltage value is smaller than the predetermined voltage threshold value VT1, the state determining unit 13 determines that the sensor is in the abnormal voltage state in which a sufficient voltage cannot be applied across the electrodes 221 and 231.

Figure 20:
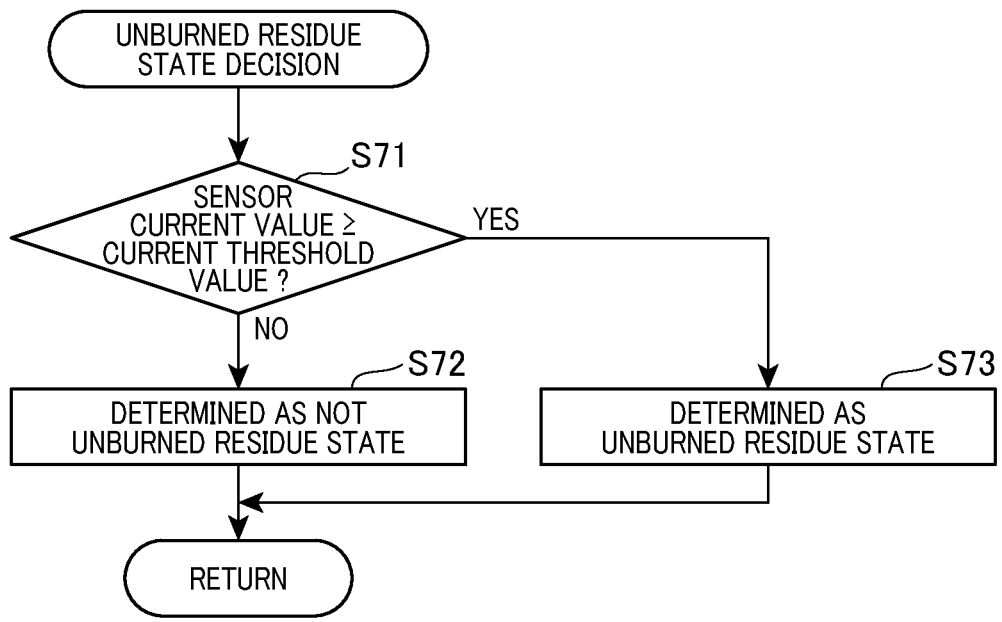
FIG. 20 is a flowchart showing the flow of a process carried out by the control device according to the first embodiment.

The flow of the specific process carried out to make the unburned residue decision will be described with reference to FIG. 20. The flowchart shown in FIG. 20 shows the specific flow of the process carried out to make the unburned residue decision in step S17 of FIG. 16. The process shown in FIG. 20 is carried out by the state determining unit 13.

In the first step S71 of the unburned residue decision, it is determined whether the sensor current value is smaller than the current threshold value ITB. The sensor current value used here is the sensor current value acquired in step S51 of FIG. 18. Instead, a new sensor current value may be acquired by the current value acquiring unit 12 when the unburned residue decision process is performed.

If the sensor current value is smaller than the current threshold value ITB in step S71, the process proceeds to step S72. In step S72, it is determined that the sensor is not in the unburned residue state. If the sensor current value is equal to or larger than the current threshold value ITB in step S71, the process proceeds to step S73. In step S73, it is determined that the sensor is in the unburned residue state.

Note that the unburned residue decision shown in FIG. 20 is made when it is determined in step S10 of FIG. 16 that the sensor is not in the sensor failure state. When the process proceeds to step S73, the sensor current value is equal to or larger than the current threshold value ITB even though the sensor is not in the sensor failure state. It can be determined that such an excessive sensor current value is not due to the sensor failure state but due to the PM-deposited state.

Therefore, when the process proceeds to step S73, the state determining unit 13 first determines that the sensor is in the PM-deposited state. However, since the timing at which this is determined is immediately after the start of detection of the amount of deposited particulate matter, the state determining unit 13 determines that, specifically, this PM-deposited state is the unburned residue state. When it is determined that the sensor is in the PM-deposited state instead of the sensor failure state immediately after the current value acquiring unit 12 has started acquiring the sensor current value, that is, the start of detection of the amount of deposited particulate matter, the state determining unit 13 determines that this PM-deposited state is the unburned residue state. This makes it possible to accurately determine the cause of the excessive sensor current value.

Figure 21:
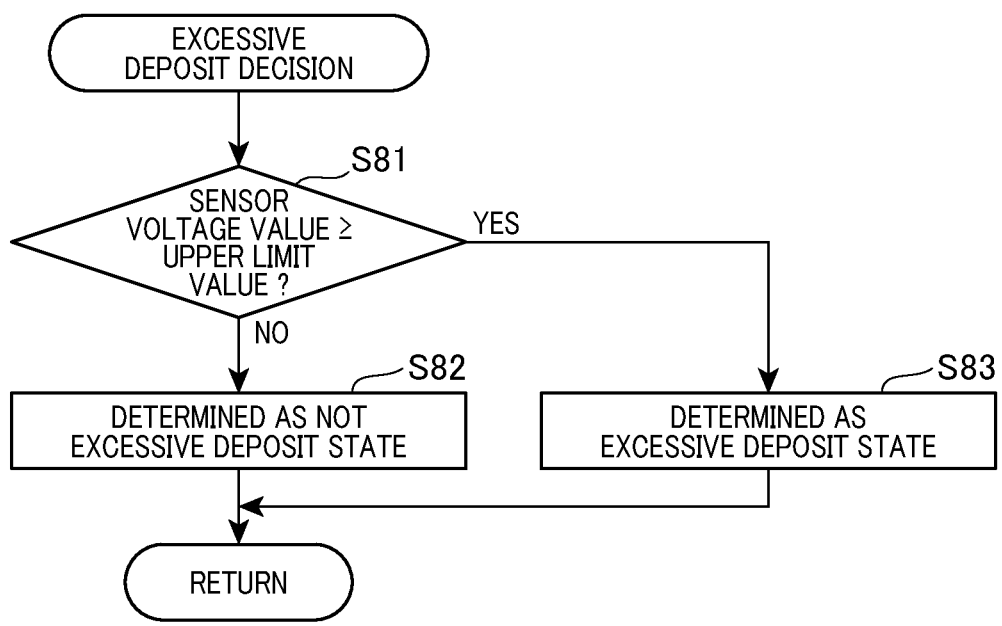
FIG. 21 is a flowchart showing the flow of a process carried out by the control device according to the first embodiment.

The flow of the specific process carried out to make the excessive deposit decision will be described with reference to FIG. 21. The flowchart shown in FIG. 21 shows the specific flow of the process carried out to make the excessive deposit decision in step S14 of FIG. 16. The process shown in FIG. 21 is carried out by the state determining unit 13.

In the first step S81 of the excessive deposit decision, it is determined whether the sensor current value is equal to or larger than the current threshold value ITS, which is the predetermined upper limit value. The sensor current value used here is the sensor current value acquired in step S51 of FIG. 18. Instead, a new sensor current value may be acquired by the current value acquiring unit 12 when the excessive deposit decision process is performed.

If the sensor current value is smaller than the current threshold value ITS in step S81, the process proceeds to step S82. In step S82, it is determined that the sensor is not in the excessive deposit state. If the sensor current value is equal to or larger than the current threshold value ITS in step S81, the process proceeds to step S83. In step S83, it is determined that the sensor is in the excessive deposit state. Accordingly, when the acquired sensor current value is equal to or larger than the current threshold value ITS, which is the predetermined upper limit value, the state determining unit 13 determines that the sensor is in the excessive deposit state.

When it is determined that the sensor is in the excessive deposit state, the application of voltage across the electrodes 221 and 231 is stopped as described above. This makes it possible to prevent a situation where the application of voltage is unnecessarily continued even though no more particulates can be collected.

Figure 22:
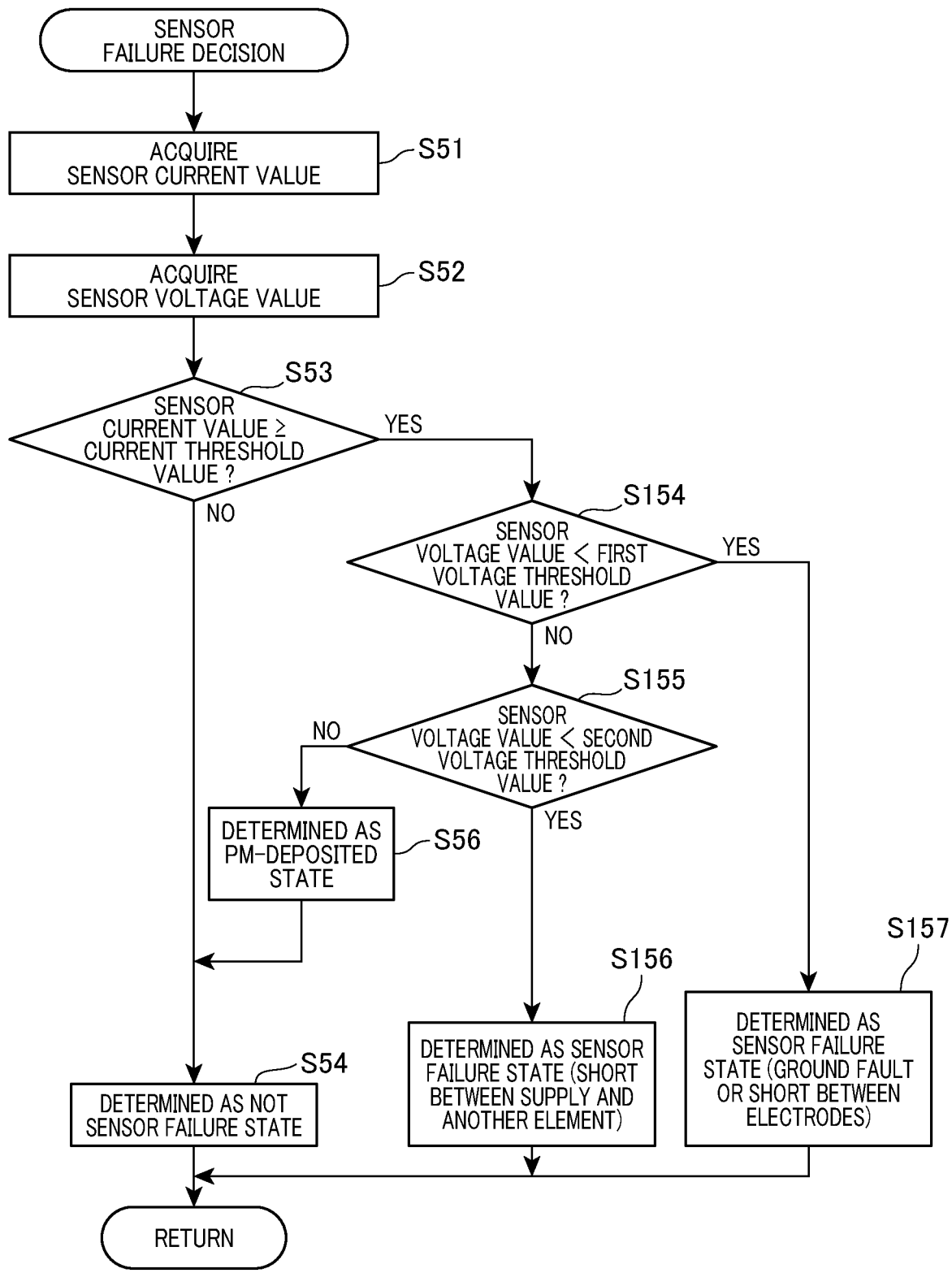
FIG. 22 is a flowchart showing the flow of a process carried out by the control device according to the second embodiment.

The second embodiment will be described with reference to FIG. 22. This embodiment differs from the first embodiment only in the specific procedures carried out for the sensor failure decision. The process shown in FIG. 22 is carried out by the state determining unit 13 in place of the process shown in FIG. 18. In FIG. 22, steps that are the same as those shown in FIG. 18 are denoted by the same reference signs (for example, S51).

If the sensor current value is equal to or larger than the current threshold value ITS in step S53, in this embodiment, the process proceeds to step S154. In step S54, it is determined whether the sensor voltage value acquired in step S52 is smaller than a first voltage threshold value. This first voltage threshold value is set in advance as a threshold value that is smaller than the voltage threshold value VT1. If the sensor voltage value is smaller than the first voltage threshold value, the process proceeds to step S157. In step S157, it is determined that the sensor is in the sensor failure state, and further, it is determined that the sensor failure state is caused by the short to ground fault shown in FIG. 7B or the short circuit between electrodes shown in FIG. 7C.

If the sensor voltage value is equal to or larger than the first voltage threshold value in step S154, the process proceeds to step S155. In step S155, it is determined whether the sensor voltage value acquired in step S52 is smaller than a second voltage threshold value. This second voltage threshold value is set in advance as a threshold value that is equal to the voltage threshold value VT1. If the sensor voltage value is equal to or larger than the second voltage threshold value, the process proceeds to step S56.

If the sensor voltage value is smaller than the second voltage threshold value, the process proceeds to step S156. In step S156, it is determined that the sensor is in the sensor failure state, and further, it is determined that the sensor failure state is caused by the short to power fault shown in FIG. 7A.

In the sensor failure state, as described above, the sensor voltage value is lower than the sensor voltage value acquired when the sensor is functioning normally. The decreased sensor voltage value differs depending on the mode of the fault. For example, when the fault is a short to power fault, the sensor voltage value decreases from the initial 35V to about 30V. When the fault is a short to ground fault or a short circuit between electrodes, the sensor voltage value decreases from the initial 35V to about 27V.

Accordingly, the first voltage threshold value may be set to a value between the sensor voltage value acquired when the sensor is functioning normally and the sensor voltage value acquired when a short to ground fault has occurred. The second voltage threshold value may be set to a value between the sensor voltage value acquired when a short to ground fault has occurred and the sensor voltage value acquired when a short to power fault has occurred. This makes it possible to determine how the failure occurred in addition to determining whether the sensor is in the sensor failure state.

Embodiments have been described with reference to specific examples. However, the present disclosure is not limited to these specific examples. Variations obtained by those skilled in the art making design changes to the specific examples as appropriate also fall within the scope of the present disclosure as long as they have the feature(s) of the present disclosure. The elements of the specific examples, their arrangement, conditions, shapes, and the like are not limited to those exemplified and can be changed as appropriate. The elements of the specific examples can be combined differently as long as there is no technical contradiction.

The control devices and methods described herein may be realized using one or more dedicated computers provided by configuring a processor and a memory programmed to execute one or more functions embodied by computer programs. The control devices and methods described herein may be realized using a dedicated computer provided by configuring a processor including one or more dedicated hardware logic circuits. The control devices and methods described herein may be realized using one or more dedicated computers configured by combining a processor and a memory programmed to execute one or more functions with a processor including one or more hardware logic circuits. The computer programs may be stored in a computer-readable, non-transitional tangible recording medium as instructions executed by the computer. A dedicated hardware logic circuit or a hardware logic circuit may be realized by a digital circuit or an analog circuit including a plurality of logic circuits.

What is claimed is:
1. A control device for a particulate matter detection sensor,
the particulate matter detection sensor including an element part formed with a pair of electrodes facing each other, the particulate matter detection sensor being configured such that a current corresponding to an amount of deposit of particulate matter on the element part flows between the electrodes, the control device comprising:
- a voltage value acquiring unit that acquires a sensor voltage value which is a value of a voltage being applied across the electrodes;
- a current value acquiring unit that acquires a sensor current value which is a value of a current flowing between the electrodes;
- a state determining unit that determines a state of the particulate matter detection sensor; and
- an output unit that outputs a PM current value corresponding to the amount of deposit, wherein states which the particulate matter detection sensor is determined to be in by the state determining unit include a sensor failure state in which the particulate matter detection sensor is malfunctioning, and a PM-deposited state in which the particulate matter is deposited on the element part, and
- the state determining unit determines whether the particulate matter detection sensor is in the sensor failure state or the PM-deposited state based on the sensor voltage value and the sensor current value.

2. The control device according to claim 1, wherein the state determining unit determines that the sensor is in the sensor failure state when the sensor current value is equal to or greater than a predetermined current threshold value and the sensor voltage value is smaller than a predetermined voltage threshold value.

3. The control device according to claim 1, wherein the state determining unit determines that the sensor is in the PM-deposited state when the sensor current value is equal to or greater than a predetermined current threshold value and the sensor voltage value is equal to or greater than a predetermined voltage threshold value.

4. The control device according to claim 1, wherein the particulate matter detection sensor includes a heater for heating the element part, and
the control device further comprises a heater control unit that performs a regeneration process in which the particulate matter deposited on the element part is burned and removed by the heater.

5. The control device according to claim 4, wherein the PM-deposited state includes an unburned residue state in which there is remaining particulate matter on the element part that was not removed by the regeneration process, and
- when the state determining unit determines that the particulate matter detection sensor is in the PM-deposited state instead of the sensor failure state immediately after the current value acquiring unit has started acquiring the sensor current value, the state determining unit determines that this PM-deposited state is the unburned residue state.

6. The control device according to claim 5, wherein the heater control unit carries out the regeneration process when the state determining unit determines that the particulate matter detection sensor is in the unburned residue state.

7. The control device according to claim 5, wherein, when the decision of the state determining unit that the particulate matter detection sensor is in the unburned residue state and execution of the regeneration process by the heater control unit are repeated a predetermined number of times, and it is still determined that the particulate matter detection sensor is in the unburned residue state,
the state determining unit determines that a nonflammable substance is attached to the element part.

8. The control device according to claim 7, wherein the heater control unit does not carry out the regeneration process after the state determining unit has determined that a nonflammable substance is attached to the element part.

9. The control device according to claim 5, wherein, when the state determining unit does not determine that the particulate matter detection sensor is in the unburned residue state, the output unit outputs the PM current value based on the acquired sensor current value.

10. The control device according to claim 5, wherein the PM-deposited state further includes an excessive deposit state in which the sensor current value cannot further increase even if the particulate matter on the element part further increases, and
when the state determining unit does not determine that the particulate matter detection sensor is in the unburned residue state, and the acquired sensor current value is equal to or greater than a predetermined upper limit value, the state determining unit determines that the particulate matter detection sensor is in the excessive deposit state.

11. The control device according to claim 10, wherein, when the state determining unit determines that the particulate matter detection sensor is in the excessive deposit state, the voltage being applied across the electrodes is changed to 0 after storing the sensor current value, and
the output unit outputs the PM current value based on the stored sensor current value.

12. The control device according to claim 1, wherein, when the sensor current value is smaller than a predetermined current threshold value and the sensor voltage value is smaller than a predetermined voltage threshold value, the state determining unit determines that the particulate matter detection sensor is in an abnormal voltage state in which a sufficient voltage cannot be applied across the electrodes.

13. The control device according to claim 1, further comprising a failure handling unit that performs a fail-safe process when the state determining unit determines that the particulate matter detection sensor is in the sensor failure state.

* * * * *